United States Patent [19]
Takahashi

[11] Patent Number: 6,028,709
[45] Date of Patent: Feb. 22, 2000

[54] IMAGE DISPLAY APPARATUS

[75] Inventor: Junko Takahashi, Atsugi, Japan

[73] Assignee: Olympus Optical Co., Ltd., Tokyo, Japan

[21] Appl. No.: 08/997,979

[22] Filed: Dec. 24, 1997

[30] Foreign Application Priority Data

Dec. 24, 1996 [JP] Japan .................................. 8-343667
Nov. 20, 1997 [JP] Japan .................................. 9-318811

[51] Int. Cl.[7] .................................................. G02B 27/14
[52] U.S. Cl. ........................... 359/630; 359/631; 359/633
[58] Field of Search .................................. 359/630, 631, 359/633, 636, 637; 345/7, 8

[56] References Cited

U.S. PATENT DOCUMENTS

| | | | |
|---|---|---|---|
| Re. 27,356 | 5/1972 | La Russa | 359/494 |
| 4,026,641 | 5/1977 | Bosserman et al. | 359/869 |
| 4,322,135 | 3/1982 | Freeman | 359/643 |
| 4,669,810 | 6/1987 | Wood | 340/908 |
| 4,969,724 | 11/1990 | Ellis | 359/364 |
| 5,706,136 | 1/1998 | Okuyama et al. | 359/630 |
| 5,815,326 | 9/1998 | Takahashi | 359/729 |
| 5,959,780 | 9/1999 | Togino et al. | 359/630 |

FOREIGN PATENT DOCUMENTS

| | | |
|---|---|---|
| 3-101709 | 4/1991 | Japan . |
| 8-234137 | 9/1996 | Japan . |

*Primary Examiner*—Georgia Epps
*Assistant Examiner*—Saeed Seyrafi
*Attorney, Agent, or Firm*—Pillsbury Madison & Sutro LLP

[57] ABSTRACT

An image display apparatus providing an observation image which is clear and has minimal distortion even when an ocular optical system having a decentered reflecting surface is arranged to provide a wide observation field angle. At least one reflecting or transmitting surface in the ocular optical system of the image display apparatus has a rotationally asymmetric surface configuration having not more than two planes of symmetry which satisfies various conditions defining a surface configuration.

24 Claims, 8 Drawing Sheets

PRIOR ART
FIG. 11
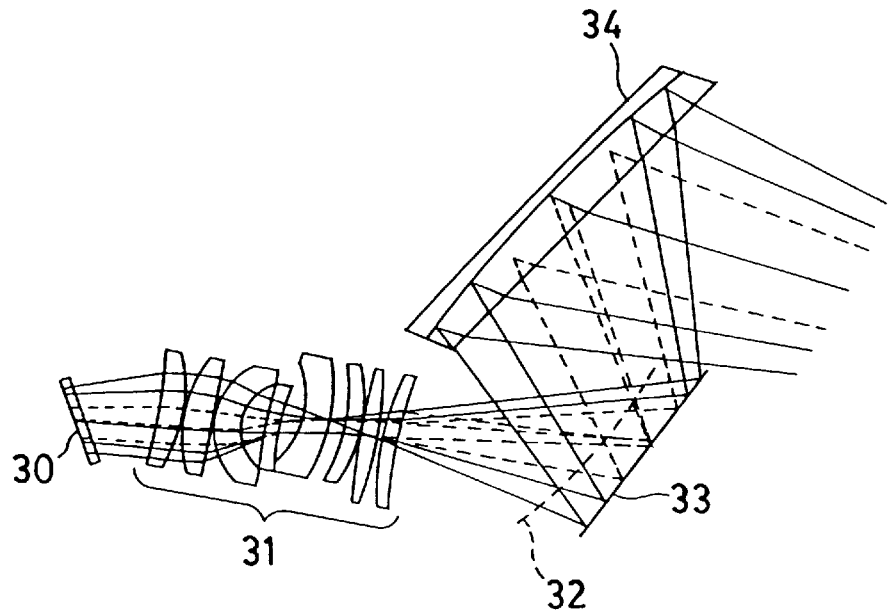
PRIOR ART
FIG.12 (a)
PRIOR ART
FIG.12 (b)
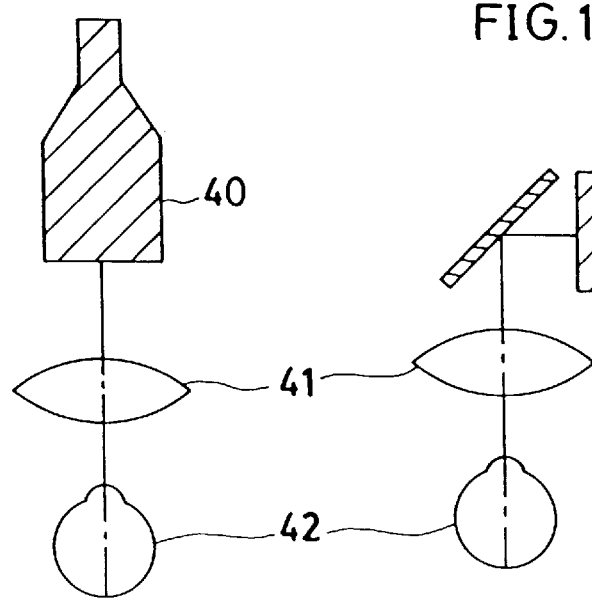
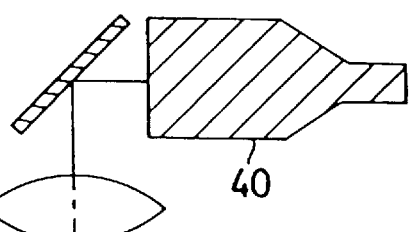

IMAGE DISPLAY APPARATUS

BACKGROUND OF THE INVENTION

The present invention relates to an image display apparatus and, more particularly, to a head- or face-mounted image display apparatus that can be retained on the observer's head or face.

A conventional image display apparatus is disclosed in Japanese Patent Application Unexamined Publication (KOKAI) No. 3-101709 (1991). FIG. 10(a) shows the entire optical system of the known image display apparatus, and FIG. 10(b) shows a part of an ocular optical system used in the image display apparatus. As illustrated in these figures, in the conventional image display apparatus, an image that is displayed by an image display device 20 is transmitted as an aerial image 25 by a relay optical system 21 including a positive lens, and the aerial image is projected into an observer's eyeball 24 (pupil) as an enlarged image by an ocular optical system 23 formed from a concave reflecting mirror 22.

U.S. Pat. No. 4,669,810 discloses another type of conventional image display apparatus. In this apparatus, as shown in FIG. 11, an image of a CRT 30 is transmitted through a relay optical system 31 to form an intermediate image 32, and the image is projected into an observer's eye by a combination of a reflection holographic element 33 and a combiner 34 having a hologram surface.

Japanese Patent Application Unexamined Publication (KOKAI) No. 62-214782 (1987) discloses another type of conventional image display apparatus. As shown in FIG. 12, the conventional image display apparatus is designed to enable an image of an image display device 40 to be observed directly by an observer's eyeball 42 (pupil) as an enlarged image through an ocular lens 41.

U.S. Pat. No. 4,026,641 discloses another type of conventional image display apparatus. In the conventional image display apparatus, as shown in FIG. 13, an image of an image display device 50 is transferred to a curved object surface 52 by an image transfer device 51, and the image transferred to the object surface 52 is projected in the air by a toric reflector 53.

U.S. Reissued Pat. No. 27,356 discloses another type of conventional image display apparatus. As shown in FIG. 14, the apparatus is arranged such that an ocular optical system 64 comprising a semitransparent concave mirror 60 and a semitransparent plane mirror 61 projects an object surface 62 onto an exit pupil 63.

Other known image display apparatuses include those which are disclosed in U.S. Pat. Nos. 4,322,135 and 4,969,724, European Patent No. 0,583,116A2, and Japanese Patent Application Unexamined Publication (KOKAI) Nos. 7-333551 (1995) and 8-234137 (1996).

In some of these conventional techniques, a reflecting surface and a transmitting surface, which constitute an optical system, are formed by using surfaces having a simple surface configuration with a strong symmetry, such as a spherical surface, a rotationally symmetric aspherical surface or a toric surface. Therefore, ray aberration and distortion produced by a decentered surface having a power have heretofore been impossible to correct simultaneously and favorably. Accordingly, the observer can view an image for observation only in a distorted condition and may feel discomforted. This may also make the observer's eye tired and cause him or her to have a headache.

In a case where the optical system is provided for each of the user's left and right eyes, another problem arises in addition to the above-described problem. That is, images viewed with the left and right eyes are distorted to be asymmetric with each other and cannot properly be fused into a single image. This problem becomes particularly remarkable when the performance of the image display apparatus is improved in order to enhance its dynamic presence by using a display device of high resolution, an ocular optical system of wide field angle, etc. Consequently, the functions of these high-grade devices are degraded. Moreover, in the case of displaying a figure, for example, the displayed figure appears to be distorted, making it impossible to correctly recognize the shape of the displayed figure and thus causing the dynamic presence to be completely lost.

Some of the above-described conventional techniques propose using surfaces having a complicated surface configuration with a little symmetry, such as an anamorphic surface having only two planes of symmetry and a plane-symmetry free-form (three-dimensional) surface having only one plane of symmetry, as a surface for simultaneously correcting such aberrations and distortion produced by a decentered surface. It is certain that these surfaces can correct aberrations due to decentration which cannot satisfactorily be corrected by an optical system using a spherical surface, a rotationally symmetric aspherical surface, or a toric surface. In the conventional techniques using such an anamorphic surface or a plane-symmetry free-form surface, however, the complicated surface configurations have not thoroughly been examined, and the proposed surface configurations are inadequate to correct aberrations due to decentration simultaneously and favorably. In particular, when the field angle is enlarged, the aberration correcting performance is deteriorated to a considerable extent. There have heretofore been no satisfactory specific surface configurations of anamorphic surfaces or plane-symmetry free-form surfaces capable of satisfactorily correcting aberrations due to decentration.

SUMMARY OF THE INVENTION

In view of the above-described problems of the conventional techniques, an object of the present invention is to provide a head-mounted image display apparatus favorably corrected for aberrations due to decentration and capable of providing an observation image which is clear and has minimal distortion even at a wide field angle.

To attain the above-described object, the present invention enables aberrations due to decentration to be effectively corrected by thoroughly examining rotationally asymmetric surface configurations and using rotationally asymmetric surfaces having not more than two planes of symmetry, e.g. an anamorphic surface (i.e. a rotationally asymmetric surface having only two planes of symmetry) and a plane-symmetry free-form surface (i.e. a rotationally asymmetric surface having only one plane of symmetry), which satisfy predetermined conditions.

The present invention may be applied to an image display apparatus including an image display device and an ocular optical system for leading an image formed by the image display device to the position of an eyeball of an observer without forming an intermediate image so that the image can be observed as a virtual image. The present invention is directed to an image display apparatus of the type described above, which includes an ocular optical system having at least two decentered reflecting surfaces with a refracting power and in which aberrations due to decentration affect the image for observation. The present invention presents the following three inventive forms as schemes for favorably correcting decentration aberrations produced in the ocular optical system.

In one form of the present invention, of the at least two decentered reflecting surfaces with a refracting power in the ocular optical system, at least one reflecting surface having the strongest refracting power is formed from a rotationally asymmetric surface having not more than two planes of symmetry, and the rotationally asymmetric surface has a configuration which satisfies the conditions described later.

In another form of the present invention, of the at least two decentered reflecting surfaces with a refracting power in the ocular optical system, at least one reflecting surface other than a reflecting surface having the strongest refracting power is formed from a rotationally asymmetric surface having not more than two planes of symmetry, and the rotationally asymmetric surface has a configuration which satisfies the conditions described later.

In still another form of the present invention, attention is paid also to an arrangement other than the at least two decentered reflecting surfaces with a refracting power in the ocular optical system. That is, when the ocular optical system has a transmitting surface disposed to face the image display device, at least one of the at least two reflecting surfaces is formed from a rotationally asymmetric surface having not more than two planes of symmetry, and the transmitting surface is also a rotationally asymmetric surface having not more than two planes of symmetry and has a rotationally asymmetric surface configuration which satisfies the conditions described later.

The reasons why the ocular optical system of the image display apparatus according to the present invention uses an arrangement provided with rotationally asymmetric surfaces having not more than two planes of symmetry, e.g. an anamorphic surface having only two planes of symmetry and a plane-symmetry free-form surface having only one plane of symmetry, together with the function thereof, will be described below with reference to FIG. 8, which illustrates a typical ocular optical system according to the present invention.

In FIG. 8, an ocular optical system 7 comprises three surfaces (3, 4 and 5) disposed along an optical path. In the illustrated image display apparatus, a bundle of light rays emitted from an image display device 6 enters the ocular optical system 7 through a third surface 5 thereof which is a transmitting surface disposed to face the image display device 6. The incident light is reflected away from the position of an observer's pupil 1 by a first surface 3 which is a reflecting-transmitting surface disposed immediately in front of the pupil 1. The reflected light is reflected toward the observer's pupil 1 by a second surface 4 which is a reflecting surface disposed to face both the pupil 1 and the first surface 3, which is a reflecting-transmitting surface. The image display apparatus is arranged such that the position of the exit pupil of the ocular optical system is approximately coincident with the position of the observer's pupil 1 so that the reflected light from the second surface 4 passes through the first surface 3, which is a reflecting-transmitting surface, and enters the observer's pupil 1 (in the vicinity of the observer's iris position or eyeball rolling center) so as to be projected into the observer's eyeball.

Thus, in the present invention, the surface Nos. of the ocular optical system are, in principle, given as ordinal numbers in backward ray tracing from the exit pupil (observer's pupil 1) to the image display device 6. For the purpose of facilitating the understanding, the present invention will be described below on the assumption that it is applied to an ocular optical system of the type illustrated in FIG. 8, in which the number of reflections is as small as two. It should, however, be noted that the present invention is not necessarily limited to the ocular optical system shown in FIG. 8, in which two reflections take place, but may also be applied to other types of ocular optical system, such as those shown in Japanese Patent Application No. 8-92301 (head-mounted image display apparatus), filed in Japan by the present applicant on Apr. 15, 1996, i.e. various types of ocular optical systems as shown in FIGS. 16 to 22 of the prior application. The present invention can also be applied to other known ocular optical systems in which two or more reflections take place and the problems explicitly stated in the present invention occur.

Next, a coordinate system used in the present invention will be explained.

As shown in FIG. 8, a visual axis 2 is defined by a straight line along which an axial principal ray passing through the center of the pupil 1 and reaching the center of the image display device 6, which is a device for forming an image to be observed, travels after emanating from the pupil 1 until it intersects the first surface 3 of the ocular optical system 7. The visual axis 2 is defined as a Z-axis. An axis which perpendicularly intersects the Z-axis and which lies in a plane of decentration of each surface constituting the ocular optical system 7 is defined as a Y-axis. An axis which perpendicularly intersects both the visual axis 2 and the Y-axis is defined as an X-axis.

The following explanation will be made on the basis of backward ray tracing in which light rays are traced from the pupil 1 toward the image display device 6 for forming an image to be observed, unless otherwise specified.

In a non-decentered lens system in which lens elements are disposed in a coaxial relation to each other and a conventionally known lens system in which some of lens elements are slightly shifted or tilted, it is generally known to use rotationally symmetric aspherical surfaces having an axis of rotational symmetry in a plane in order to effect favorable aberration correction with a minimal number of surfaces. That is, spherical lens systems generally adopt an aberration correcting mechanism arranged such that rotationally symmetric aberrations produced by a rotationally symmetric spherical surface, such as rotationally symmetric spherical aberration, coma and field curvature, are canceled by rotationally symmetric aberrations produced by another surface. Thus, the increase in the number of constituent surfaces of the whole optical system due to the need for improving the aberration correcting performance of the optical system is reduced by using a rotationally symmetric aspherical surface in place of a spherical surface.

However, an optical system in which constituent surfaces are decentered as in an ocular optical system used in the image display apparatus according to the present invention suffers from rotationally asymmetric aberrations due to decentration which are different from rotationally symmetric aberrations produced by a rotationally symmetric spherical surface or the like. Therefore, decentration aberrations which appear in rotationally asymmetric form cannot be corrected by a conventionally employed rotationally symmetric aspherical surface on account of the characteristics of its surface configuration, that is, rotationally symmetric surface configuration. It should be noted that aberrations due to decentration discussed herein include coma, astigmatism, image distortion, field curvature, etc.

There is a conventional example in which a toric surface, which is a rotationally asymmetric surface, is used to correct such decentration aberrations. However, in the conventional technique, great importance has been placed on the correction of astigmatism among aberrations caused by decentration, and there has heretofore been proposed no optical system which is satisfactorily corrected for other aberrations including image distortion in particular. In addition, the optical system using a toric surface is limited in its capability of correcting astigmatism caused by decentration. Consequently, the problem that the field angle becomes undesirably narrow or the size of the optical system becomes unfavorably large is unavoidably left unsolved. Therefore, there has heretofore been realized no optical system which is compact and provides a wide field angle and which is satisfactorily corrected for various aberrations including astigmatism and image distortion in particular as in the present invention.

Accordingly, an effective way of correcting rotationally asymmetric decentration aberrations is to use a rotationally asymmetric surface having not more than two planes of symmetry, e.g. an anamorphic surface having two planes of symmetry and a plane-symmetry free-form surface having only one plane of symmetry, as a rotationally asymmetric surface other than toric surfaces.

The reasons why the use of an anamorphic surface, a plane-symmetry free-form surface, etc. is effective in correcting various decentration aberrations will be explained below.

First, a bow-shaped image distortion produced by a decentered reflecting concave mirror will be explained. On account of the disposition of an image display device (e.g. an LCD), a reflecting surface having the strongest refracting power in the optical system is decentered, and an image formed by light rays reflected by the reflecting concave surface has an image distortion due to the decentration. Therefore, by using a rotationally asymmetric surface having not more than two planes of symmetry, e.g. an anamorphic surface or a plane-symmetry free-form surface as in the present invention, as the reflecting surface having the strongest refracting power in the optical system, the reflecting surface itself can be given a desired tilt in the Y-axis direction at a desired position on the X-axis in a coordinate system in which a Y-axis is taken in the direction of decentration, and a Z-axis is taken in the direction of the visual axis of the observer's eyeball, and further an axis that perpendicularly intersects both the Y- and Z-axes is defined as an X-axis. By doing so, it is possible to correct image distortions produced by a decentered reflecting concave mirror, particularly an image distortion which occurs in the Y-axis direction, varying according to the image height in the X-axis direction. Consequently, it becomes possible to favorably correct an image distortion in which a horizontal line is observed as being a bow-shaped line.

Next, a trapezoidal distortion produced by a decentered concave mirror will be explained. Let us explain the image distortion by backward ray tracing from the observer's pupil (eyeball side). Light rays emanating from the pupil (eyeball side) divergently in the X-axis direction are reflected by the second surface, which is decentered, by way of example. At this time, light rays striking the second surface in the positive direction of the Y-axis and light rays striking the second surface in the negative direction of the Y-axis are reflected by the second surface after a considerable difference has been produced between these light rays in terms of divergence in the X-axis direction due to the difference in optical path length between them. Consequently, an image to be observed is formed with a difference in size between an image lying in the positive direction of the Y-axis and an image in the negative direction of the Y-axis. As a result, the observation image has a trapezoidal distortion.

This distortion is produced by a decentered reflecting surface. Therefore, a similar trapezoidal distortion is produced not only by the second surface but also by any decentered reflecting surface in an ocular optical system.

The trapezoidal distortion can also be corrected by using a rotationally asymmetric surface having not more than two planes of symmetry, e.g. an anamorphic surface or a plane-symmetry free-form surface, according to the present invention. This is because, as will be clear from a defining equation (b) shown later, a rotationally asymmetric surface has terms with odd-numbered powers of Y and terms with even-numbered powers of X, which enable the curvature to be changed in the X-axis direction as desired according to the sign (positive or negative) of the Y-axis.

Next, a rotationally symmetric image distortion will be explained. For example, in an optical system which has a pupil lying away from a reflecting concave surface having the strongest refracting power in the optical system and which provides a wide field angle as in the ocular optical system according to the present invention, a rotationally symmetric pincushion distortion occurs to a considerable extent in backward ray tracing from the pupil plane side. The occurrence of such an image distortion can be suppressed by increasing the tilt of the peripheral portion of the reflecting surface.

Next, a rotationally asymmetric field curvature produced by a decentered reflecting concave mirror will be explained. Let us explain the field curvature by backward ray tracing from the observer's eyeball. Light rays emanating from the eyeball divergently in the X-axis direction are reflected by the decentered reflecting concave surface having the strongest refracting power in the optical system. The distance to the image surface (i.e. the image display device as an image forming device) from a point on which a light ray impinges is a half of the curvature at the portion on which the light ray impinges. That is, the light rays form an image surface which is tilted with respect to the direction of travel of light rays having been reflected from the decentered concave mirror. Using a rotationally asymmetric surface having not more than two planes of symmetry, e.g. an anamorphic surface or a plane-symmetry free-form surface, according to the present invention makes it possible to give desired curvatures in the X- and Y-axis directions at any point relative to the positive and negative directions of the Y-axis. This is because, as will be clear from the defining equation (b) shown later, a rotationally asymmetric surface having not more than two planes of symmetry has odd-numbered powers of Y which enable the curvature to be varied as desired according to the sign (positive or negative) of the Y-axis. This is effective in correcting a rotationally asymmetric field curvature, particularly the tilt of the image surface, produced by a decentered reflecting concave mirror.

Next, a rotationally symmetric field curvature will be explained. In general, a reflecting mirror produces curvature of field along the reflecting surface. The field curvature can be favorably corrected by a rotationally asymmetric surface because it has a surface configuration which enables a desired curvature to be given at any position.

Astigmatism can be corrected by appropriately changing the difference between the second-order differential or curvature in the X-axis direction and the second-order differential or curvature in the Y-axis direction.

Coma can be corrected by giving a desired tilt in the Y-axis direction at any point on the X-axis on the basis of the same idea as that for a bow-shaped image distortion described above.

It is desirable that a rotationally asymmetric surface having not more than two planes of symmetry, e.g. an anamorphic surface or a plane-symmetry free-form surface, which enables decentration aberrations to be favorably corrected on the basis of the above-described principles, should be arranged in the ocular optical system according to the present invention as follows.

If the above-described rotationally asymmetric surface is provided on each of at least two of a plurality of reflecting surfaces with a refracting power which are decentered in the ocular optical system, the two reflecting surfaces act synergistically, so that various aberrations can be effectively corrected.

It is desirable that the two reflecting surfaces provided with the rotationally asymmetric surfaces should be disposed to face each other.

If the ocular optical system has a large number of decentered reflecting surfaces with a refracting power, it is desirable from the viewpoint of aberration correction to increase the number of rotationally asymmetric surfaces in proportion to the number of reflecting surfaces. It is even more desirable from the viewpoint of correcting decentration aberrations to provide the rotationally asymmetric surface on every decentered reflecting surface with a refracting power of the ocular optical system.

It is desirable from the viewpoint of minimizing comatic aberration that the rotationally asymmetric surface should be used to form at least one refracting surface, more desirably each of a plurality of refracting surfaces of the ocular optical system. The reason for this is that when light rays are refracted by a refracting surface, the surface has a tilt with respect to the axial principal ray.

It is desirable from the viewpoint of correcting image distortion that at least one refracting surface formed as a rotationally asymmetric surface should be a transmitting surface disposed to face the image display device. The reason for this is that the surface facing the image display device is disposed in close proximity to the image formation position; therefore, the image distortion can be favorably corrected without aggravating other aberrations by forming this surface as a rotationally asymmetric surface.

The rotationally asymmetric surface is difficult to produce in comparison to plane surfaces and rotationally symmetric surfaces because of its complicated surface configuration. Therefore, from the viewpoint of correcting decentration aberrations and the viewpoint of the ease of production of optical components and the speed of mass-production, it is desirable to minimize the number of rotationally asymmetric surfaces used in the ocular optical system. Accordingly, from the viewpoint of effectively correcting decentration aberrations by a single surface and of facilitating the production and improving the speed of mass-production, it is desirable that a surface having the largest refracting power and producing the largest amount of decentration aberrations among reflecting surfaces constituting the ocular optical system or a surface which affects a bundle of light rays a plurality of times (e.g. a surface serving as both transmitting and reflecting surfaces affects a ray bundle twice in total, i.e. once during transmission and once during reflection) should be formed with a rotationally asymmetric configuration, and the other surfaces should be formed as surfaces with a simple configuration, e.g. a plane surface, a spherical surface, or a decentered rotationally symmetric surface.

From the viewpoint of simplifying the arrangement of the ocular lens system, it is desirable that the transmitting surface in the ocular optical system which is disposed to face the image display device should be arranged in the form of a rotationally symmetric aspherical surface, more desirably a spherical surface, and even more desirably a plane surface, because the transmitting surface produces a small amount of decentration aberrations in comparison to the other surfaces.

It is desirable from the viewpoint of correcting decentration aberrations even more effectively that the rotationally asymmetric surface should be a plane-symmetry free-form surface having only one plane of symmetry. The reason for this is as follows: When a coordinate system is defined as shown for example in FIG. 8, a free-form surface is arranged such that the YZ-plane, which is a plane containing the decentering direction of decentered surfaces, is a plane of symmetry. By doing so, the image on the image-formation plane in the backward ray tracing can be made symmetric about the YZ-plane as a plane of symmetry. Thus, the effort to correct aberrations can be reduced to a considerable extent.

In a case where a reflecting surface of the ocular optical system according to the present invention has only a reflecting action, it is desirable to form the surface as a back-coated reflecting mirror that is produced by providing mirror coating on a medium having a refractive index larger than 1.3.

In a case where a reflecting surface of the ocular optical system according to the present invention serves as both reflecting and transmitting surfaces, it is desirable to form the surface from a half-mirror surface from the viewpoint that it does not limit the size and freedom of the ocular optical system. From the viewpoint of reducing the loss of light quantity, it is desirable to form the reflecting surface from a totally reflecting surface arranged such that light rays are incident on the reflecting surface at an angle exceeding the critical angle for total reflection.

It is desirable for the ocular optical system according to the present invention to be formed from a prism member from the viewpoint of constructing the optical system in a compact form and facilitating the assembly thereof.

It is desirable from the viewpoint of achieving a lightweight ocular optical system that the prism member should be made of a plastic medium having a refractive index larger than 1.3.

It is desirable that the configuration of the rotationally asymmetric surface of the ocular optical system, arranged as described above, should satisfy the following conditions from the viewpoint of providing a wide field angle and favorably correcting decentration aberrations.

First, when X-, Y- and Z-axes are determined according to the above definition, six principal rays among those which emanate from the center of the pupil position and enter the image display device are determined by combinations of field angles in the directions X and Y, i.e. the field angle zero in the direction X, the maximum field angle in the direction X, the maximum field angle in the direction +Y, the field angle zero in the direction Y, and the maximum field angle in the direction −Y, as shown in Table 1 below:

TABLE 1

|  | Field angle zero in X-axis direction | Maximum field angle in X-axis direction |
|---|---|---|
| Maximum field angle in Y-axis direction | 101 | 104 |
| Field angle zero in Y-axis direction | 102 | 105 |
| Minimum field angle in Y-axis direction | 103 | 106 |

As shown in Table 1, six principal rays are determined. That is, with respect to the image display area of the image display device, an axial principal ray corresponding to the center of the image display area where the field angles in both the X- and Y-axis directions are zero is defined as 102; a principal ray corresponding to the center of the upper edge of the image display area where the field angle in the X-axis direction is zero and the field angle in the Y-axis direction is the maximum is defined as 101; a principal ray corresponding to the upper-right corner of the image display area where the field angles in both the X- and Y-axis directions are the maximum is defined as 104; a principal ray corresponding to the center of the right-hand edge of the image display area where the field angle in the X-axis direction is the maximum and the field angle in the Y-axis direction is zero is defined as 105; a principal ray corresponding to the lower-right corner of the image display area where the field angle in the X-axis direction is the maximum and the field angle in the Y-axis direction is the minimum (the maximum in the negative direction) is defined as 106; and a principal ray corresponding to the center of the lower edge of the image display area where the field angle in the X-axis direction is zero and the field angle in the Y-axis direction is the minimum is defined as 103. An area where the principal rays 101 to 106 intersect each particular surface is defined as an effective area.

First, conditions concerning the tilt of a reflecting surface will be shown.

In the ocular optical system according to the present invention, which includes at least two decentered reflecting surfaces having a refracting power, the occurrence of a rotationally asymmetric image distortion due to decentration gives rise to a problem. The following conditions (1-1), (2-1) and (3-1) are particularly necessary to satisfy in order to correct a trapezoidal image distortion such that the respective lengths of the upside and base of a trapezoid are made equal to each other.

In the present invention, it is desirable from the viewpoint of aberration correction to satisfy the following conditions:

$$-0.80 < DX4 < -0.20 (1/mm) \quad (1\text{-}1)$$

$$-0.80 < DX5 < -0.20 (1/mm) \quad (2\text{-}1)$$

$$-0.80 < DX6 < -0.20 (1/mm) \quad (3\text{-}1)$$

where DX4, DX5 and DX6 are the tilts in the X-axis direction at respective positions on a reflecting concave surface having the strongest refracting power in the ocular optical system at which the principal rays 104, 105 and 106 defining the maximum observation field angle in the X-axis direction are reflected.

If at least one of DX4, DX5 and DX6 in the conditions (1-1), (2-1) and (3-1) is not smaller than the upper limit, i.e. −0.20, or not larger than the lower limit, i.e. −0.80, the tilt of the surface in the effective area cannot satisfactorily correct image distortions due to decentration. Consequently, a distortion that is not rotationally symmetric becomes undesirably large.

It is more desirable to satisfy the following conditions:

$$-0.50 < DX4 < -0.20 (1/mm) \quad (1\text{-}2)$$

$$-0.50 < DX5 < -0.20 (1/mm) \quad (2\text{-}2)$$

$$-0.50 < DX6 < -0.20 (1/mm) \quad (3\text{-}2)$$

It is important to satisfy the conditions (1-2), (2-2) and (3-2) when the observation field angle of the ocular optical system exceeds 20 degrees and it is necessary to minimize a trapezoidal distortion.

It is even more desirable to satisfy the following conditions:

$$-0.30 < DX4 < -0.20 (1/mm) \quad (1\text{-}3)$$

$$-0.30 < DX5 < -0.20 (1/mm) \quad (2\text{-}3)$$

$$-0.30 < DX6 < -0.20 (1/mm) \quad (3\text{-}3)$$

It is important to satisfy the conditions (1-3), (2-3) and (3-3) when the observation field angle of the ocular optical system exceeds 30 degrees and it is necessary to minimize a trapezoidal distortion.

It is still more desirable to satisfy the following conditions:

$$-0.30 < DX4 < -0.23 (1/mm) \quad (1\text{-}4)$$

$$-0.30 < DX5 < -0.23 (1/mm) \quad (2\text{-}4)$$

$$-0.30 < DX6 < -0.23 (1/mm) \quad (3\text{-}4)$$

It is important to satisfy the conditions (1-4), (2-4) and (3-4) when the observation field angle of the ocular optical system exceeds 40 degrees and it is necessary to minimize a trapezoidal distortion. The above conditions are effective for obtaining a favorable image for observation at a wide observation field angle.

In an ocular optical system which has a pupil formed away from a reflecting concave surface and which provides a wide field angle as in the present invention, a rotationally symmetric pincushion image distortion occurs to a considerable extent in backward ray tracing from the pupil plane side. Therefore, to minimize the image distortion and a trapezoidal distortion due to decentration simultaneously and effectively, it is desirable that at least one reflecting surface other than the reflecting surface having the strongest refracting power in the ocular optical system should satisfy all the following conditions (4-1), (5-1) and (6-1) simultaneously:

$$-0.120 < DX5A < -0.095 (1/mm) \quad (4\text{-}1)$$

$$|DX5A - DX4A| < 0.05 (1/mm) \quad (5\text{-}1)$$

$$|DX5A - DX6A| < 0.05 (1/mm) \quad (6\text{-}1)$$

where DX4A, DX5A and DX6A are the tilts in the X-axis direction at respective positions on at least one reflecting surface other than the reflecting surface having the strongest refracting power in the ocular optical system at which the surface is struck by the principal rays 104 and 106 (corresponding to 104 to 106 in Table 1) defining the maximum observation field angle in the X-axis direction.

It is assumed that neither |DX5A−DX4A| nor |DX5A−DX6A| in the above conditions includes zero.

If DX5A is not smaller than the upper limit of the condition (4-1), i.e. −0.095, a trapezoidal distortion due to decentration cannot satisfactorily be corrected, whereas, if DX5A is not larger than the lower limit, i.e. −0.120, the tilt of the surface becomes undesirably large at an area that reflects the principal ray defining the maximum field angle in the X-axis direction, causing the trapezoidal distortion to be over-corrected undesirably. The conditions (5-1) and (6-1) are necessary to satisfy in order to keep the aspect ratio unchanged even if the focal length differs among points of different observation field angles.

It is more desirable to satisfy the following conditions:

$$-0.110 < DX5A < -0.095 (1/mm) \qquad (4\text{-}2)$$

$$|DX5A - DX4A| < 0.04 (1/mm) \qquad (5\text{-}2)$$

$$|DX5A - DX6A| < 0.04 (1/mm) \qquad (6\text{-}2)$$

It is important to satisfy the conditions (4-2), (5-2) and (6-2) from the viewpoint of obtaining the advantageous effects of the conditions (4-1), (5-1) and (6-1) even more remarkably.

As has been stated above, a decentered surface produces a rotationally asymmetric image distortion owing to the difference in height between light rays impinging on the surface. To correct the rotationally asymmetric image distortion, it is important that a reflecting surface decentered with respect to the axial principal ray should satisfy the above conditions.

It is still more desirable that all the decentered reflecting and transmitting surfaces should satisfy the above conditions, as a matter of course.

Asymmetric image distortions unique to a decentered optical system include not only a trapezoidal image distortion but also an image distortion in which a horizontal straight line is imaged to be a bow-shaped line, and a rotationally symmetric pincushion image distortion in the backward ray tracing from the pupil plane side. Conditions for minimizing the bow-shaped image distortion and rotationally symmetric pincushion image distortion will be explained below.

In the present invention, if a reflecting surface having the strongest refracting power in the ocular optical system satisfies the following condition, it is possible to minimize an image distortion in which a horizontal straight line is imaged to be a bow-shaped line. Therefore, it is desirable from the viewpoint of aberration correction to satisfy either the following condition (7-1) or (8-1):

$$0.26 < DY6 - DY4 < 0.40 (1/mm) \qquad (7\text{-}1)$$

$$0.19 < DY3 - DY1 < 0.38 (1/mm) \qquad (8\text{-}1)$$

where DY4, DY6, DY3 and DY1 are the tilts of the reflecting surface in the Y-axis direction, which corresponds to the surface decentration direction in an equation defining the rotationally asymmetric surface configuration of the reflecting surface, at respective positions where the following four principal rays intersect the reflecting surface: i.e. the principal ray 104 in the field angle direction corresponding to the upper-right corner of the image display area; the principal ray 106 in the field angle direction corresponding to the lower-right corner of the image display area; the principal ray 103 in the field angle direction corresponding to the center of the lower edge of the image display area; and the principal ray 101 in the field angle direction corresponding to the center of the upper edge of the image display area.

If DY6−DY4 is not larger than the lower limit of the condition (7-1), i.e. 0.26, the tilt in the Y-axis direction of the center of the right-end portion of the effective area becomes excessively small, and it becomes impossible to satisfactorily correct bow-shaped field curvature. If DY6−DY4 is not smaller than the upper limit of the condition (7-1), i.e. 0.40, over-correction results. Consequently, the aberration occurs to a considerable extent in the reverse direction.

If DY3−DY1 is not larger than the lower limit of the condition (8-1), i.e. 0.19, the tilt in the Y-axis direction of the center of the right-end portion of the effective area becomes excessively small, and it becomes impossible to satisfactorily correct bow-shaped field curvature. If DY3−DY1 is not smaller than the upper limit of the condition (8-1), i.e. 0.38, over-correction results. Consequently, the aberration occurs to a considerable extent in the reverse direction.

It is more desirable to satisfy the following conditions (7-1) and (8-2):

$$0.26 < DY6 - DY4 < 0.40 (1/mm) \qquad (7\text{-}1)$$

$$0.20 < DY3 - DY1 < 0.37 (1/mm) \qquad (8\text{-}2)$$

It is important to satisfy the above conditions (7-1) and (8-2) to obtain a favorable image when the observation field angle exceeds 30 degrees.

It is still more desirable to satisfy the following conditions (7-1) and (8-3):

$$0.26 < DY6 - DY4 < 0.40 (1/mm) \qquad (7\text{-}1)$$

$$0.21 < DY3 - DY1 < 0.35 (1/mm) \qquad (8\text{-}3)$$

It is important to satisfy the above conditions (7-1) and (8-3) to obtain a favorable image when the observation field angle exceeds 40 degrees.

In the ocular optical system according to the present invention, the occurrence of a rotationally symmetric pincushion image distortion and a bow-shaped image distortion can be suppressed even more effectively by arranging the ocular optical system such that a reflecting surface other than the reflecting surface having the strongest refracting power in the ocular optical system satisfies the following conditions (9-1) and (10-1) simultaneously:

$$0.05 < DY6A - DY4A < 0.20 (1/mm) \qquad (9\text{-}1)$$

$$0.05 < DY3A - DY1A < 0.20 (1/mm) \qquad (10\text{-}1)$$

where DY4A, DY6A, DY3A and DY1A are the tilts of a reflecting surface other than the reflecting surface having the strongest refracting power in the Y-axis direction, which corresponds to the surface decentration direction in an equation defining the rotationally asymmetric surface configuration of the reflecting surface, at respective positions where the following four principal rays intersect the reflecting surface: i.e. the principal ray 104 in the field angle direction corresponding to the upper-right corner of the image display area; the principal ray 106 in the field angle direction corresponding to the lower-right corner of the image display area; the principal ray 103 in the field angle direction corresponding to the center of the lower edge of the image display area; and the principal ray 101 in the field angle direction corresponding to the center of the upper edge of the image display area.

If at least one of DY6A−DY4A and DY3A−DY1A is not smaller than the upper limit of the conditions (9-1) and (10-1), i.e. 0.20, the tilt of the surface at the center of the right-end portion of the effective area becomes excessively large, and the bow-shaped image distortion is undesirably over-corrected. If at least one of DY6A−DY4A and DY3A−DY1A is not larger than the lower limit of the conditions (9-1) and (10-1), i.e. 0.05, the bow-shaped image distortion cannot satisfactorily be corrected.

It is more desirable to satisfy the following conditions:

$$0.06 < DY6A-DY4A < 0.15 (1/\text{mm}) \quad (9\text{-}2)$$

$$0.06 < DY3A-DY1A < 0.15 (1/\text{mm}) \quad (10\text{-}2)$$

It is important to satisfy the above conditions (9-2) and (10-2) to obtain a favorable image for observation in the case of a wide observation field angle exceeding 30 degrees.

It is still more desirable to satisfy the following conditions:

$$0.08 < DY6A-DY4A < 0.12 (1/\text{mm}) \quad (9\text{-}3)$$

$$0.08 < DY3A-DY1A < 0.12 (1/\text{mm}) \quad (10\text{-}3)$$

By satisfying the above conditions (9-3) and (10-3), the rotationally symmetric pincushion image distortion and the bow-shaped image distortion can be corrected even more effectively, and even more favorable results can be obtained in the case of a wide observation field angle exceeding 30 degrees.

If a reflecting surface other than the reflecting surface having the strongest refracting power in the ocular optical system satisfies the following conditions (11-1) and (12-1) simultaneously, it is possible to provide an optical system favorably corrected for decentration image distortions over a wide range of observation field angles:

$$-0.05 < DY6A-DY2A < 0.05 (1/\text{mm}) \quad (11\text{-}1)$$

$$-0.15 < DY4A-DY2A < -0.05 (1/\text{mm}) \quad (12\text{-}1)$$

where DY2A, DY4A and DY6A are the tilts in the Y-axis direction of the above-described reflecting surface at respective positions at which the surface is struck by the axial principal ray 102, the principal ray 104 in the field angle direction corresponding to the upper-right corner of the image display area, and the principal ray 106 in the field angle direction corresponding to the lower-right corner of the image display area, which are based on Table 1 described above.

The above conditions (11-1) and (12-1) will be explained with reference to FIG. 8 and on the basis of the backward ray tracing from the observer's pupil side. In the ocular optical system 7 shown in FIG. 8, a reflecting surface forming the second surface 4 and having the strongest refracting power is tilted with a large decentration (displacement), which is a feature of the ocular optical system 7. Therefore, aberrations due to decentration are produced to a considerable extent. It is preferable to correct the aberrations due to decentration by the first surface 3, which is a reflecting surface other than the reflecting surface having the strongest refracting power (the second surface 4; there is only one other reflecting surface because the ocular optical system shown in FIG. 8 is of the type in which there are two reflections). More specifically, it is preferable to give a large tilt to a reflecting portion (hereinafter referred to as "α1") of the first surface 3 closer to the image display device 6 in which the reflecting and transmitting regions of the first surface 3 do not overlap each other and also give a large tilt to a reflecting portion (hereinafter referred to as "β1") of the first surface 3 in which the reflecting and transmitting regions overlap each other. However, the reflecting portion β1 functions as a transmitting region when light rays from the observer's pupil 1 enter the ocular optical system 7, and if the tilt of the reflecting portion β1 is large, the reflecting region of the second surface 4 extends over a wide area, resulting unfavorably in an increase in the amount of decentration aberrations produced by the second surface 4.

In other words, to correct decentration aberrations produced by the first surface 3 and to minimize the amount of decentration aberrations produced by the second surface 4 by using the surface configuration of the second surface 4, it is desirable to arrange the first surface 3 such that DY6A–DY2A is smaller than the upper limit of the condition (11-1), i.e. 0.05, thereby reducing the tilt at the portion β1, and, at the same time, to arrange the first surface 3 such that DY4A–DY2A is smaller than the upper limit of the condition (12-1), i.e. –0.05, thereby increasing the tilt at the portion a1. However, there is a limit to the increase of the tilt at the portion a1; if DY4A–DY2A is not larger than the lower limit, i.e. –0.15, the tilt of the surface becomes excessively large, causing image distortions due to decentration to be over-corrected undesirably.

In order to obtain advantageous effects even more remarkably and to obtain a favorable image for observation at a wide observation field angle, it is more desirable to satisfy the following conditions:

$$-0.03 < DY6A-DY2A < 0.03 (1/\text{mm}) \quad (11\text{-}2)$$

$$-0.12 < DY4A-DY2A < -0.05 (1/\text{mm}) \quad (12\text{-}2)$$

It is important that the surface configuration of a transmitting surface in the ocular optical system which is disposed to face the image display device should satisfy the following condition (13-1). This is a condition for correcting image distortions produced by a surface which is decentered and has a power.

An area where the principal rays 101 to 106 based on the above Table 1 intersect the transmitting surface of the ocular optical system which is disposed to face the image display device is defined as an effective area, and an equation which defines the configuration of each particular surface [i.e. an expression in which the Z-axis is expressed as an axis of the surface, or an expression in which the surface is expressed in the form of Z=f(X,Y) on the assumption that the surface is not decentered] is solved to determine curvatures in the Y-axis direction, which corresponds to the surface decentering direction, of the surface at respective positions where the principal rays 101 to 106 impinge on the surface in the effective area. The curvatures in the Y-axis direction at these positions are denoted by CY1 to CY6. The curvatures of the surface at these positions in the X-axis direction, which perpendicularly intersects the Y-axis direction, are denoted by CX1 to CX6. At least one of the values of CX3/CX1, CX6/CX4, CY3/CY1 and CY6/CY4 is denoted by CXY, and the absolute value of CXY is denoted by |CXY|. On this assumption, it is important to satisfy the following condition:

$$1.5 < |CXY| < 100 \quad (13\text{-}1)$$

It should be noted that the condition (13-1) shows either of the following conditional ranges:

$$-100 < CXY < 1.5$$

$$1.5 < CXY < 100$$

In an optical system in which a decentered reflecting surface has the principal optical power as in the present invention, image distortions due to decentration are produced, and the image distortions are effectively corrected by a surface facing the image display device, which has no substantial effect on aberrations. If the absolute values of all the four ratios CX3/CX1, CX6/CX4, CY3/CY1 and CY6/CY4 fall outside the range defined by the condition (13-1), the change of the partial curvature in the effective area of the surface facing the image display device is so small that image distortions due to decentration cannot satisfactorily be corrected.

It is more desirable to satisfy the following condition:

$$3.0 < |CXY| < 100 \quad (13\text{-}2)$$

It is important to satisfy the condition (13-2) when the observation field angle exceeds 20 degrees.

It is even more desirable to satisfy the following condition:

$$5.0 < |CXY| < 100 \quad (13\text{-}3)$$

It is still more desirable to satisfy the following condition:

$$10.0 < |CXY| < 100 \quad (13\text{-}4)$$

It is important to satisfy the condition (13-4) when the observation field angle exceeds 30 degrees. The conditions (13-2) to (13-4) are necessary to satisfy in order to obtain a favorable image at a wide observation field angle.

Although the above various conditions have mainly been described on the assumption that the ocular optical system uses a prism member 7 as shown in FIG. 8 which comprises a first surface 3, a second surface 4 and a third surface 5 and in which the space between the three surfaces is filled with a medium having a refractive index (n) larger than 1 (n>1), it should be noted that other prism members can be similarly used, provided that they are within the scope of the present invention.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 11 is a diagram showing an optical system of a conventional image display apparatus.

FIGS. 12a–12b are diagram showing an optical system of a conventional image display apparatus.

DESCRIPTION OF THE PREFERRED EMBODIMENTS

Figure 1:
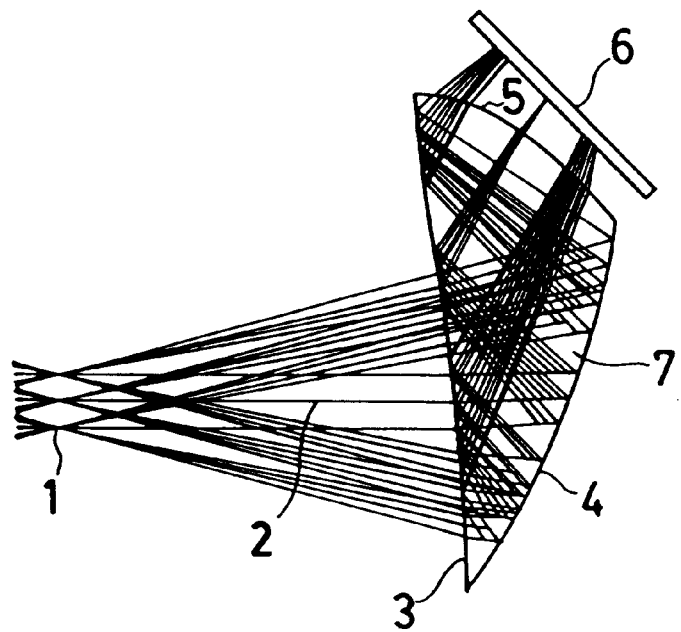
FIG. 1 is a sectional view showing an ocular optical system of an image display apparatus according to Example 1 of the present invention.
Figure 2:
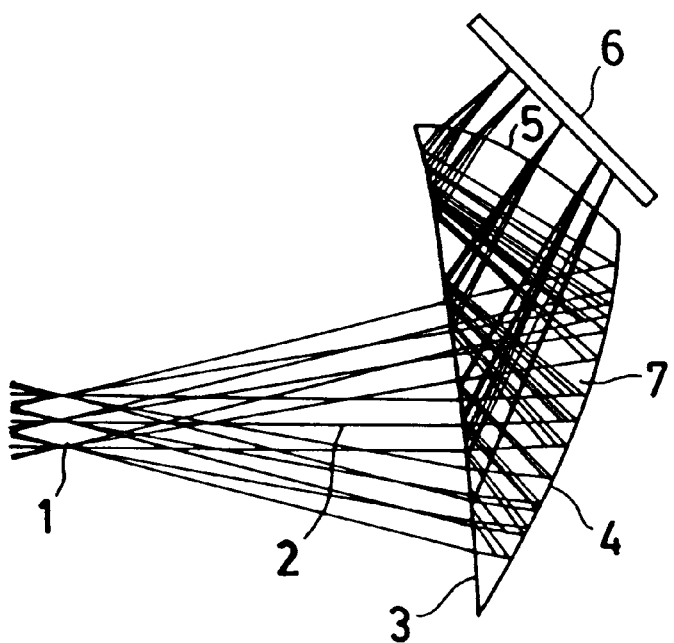
FIG. 2 is a sectional view showing an ocular optical system of an image display apparatus according to Example 2 of the present invention.
Figure 3:
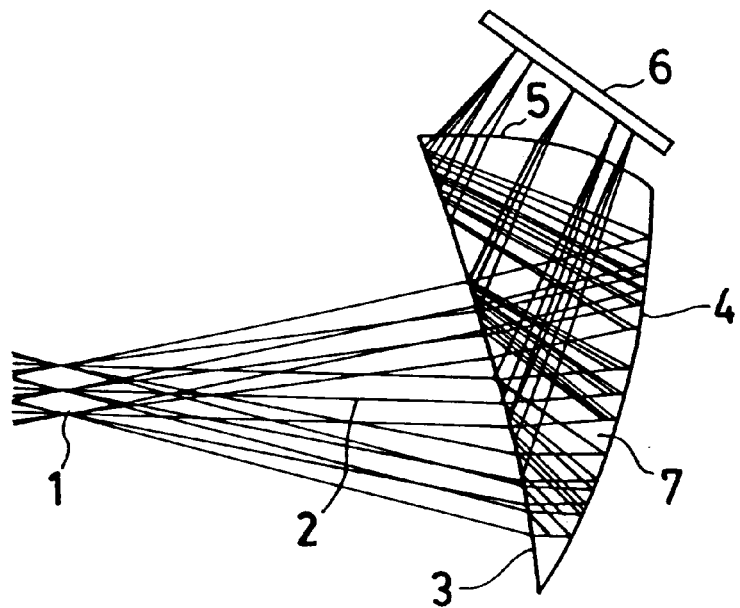
FIG. 3 is a sectional view showing an ocular optical system of an image display apparatus according to Example 3 of the present invention.
Figure 4:
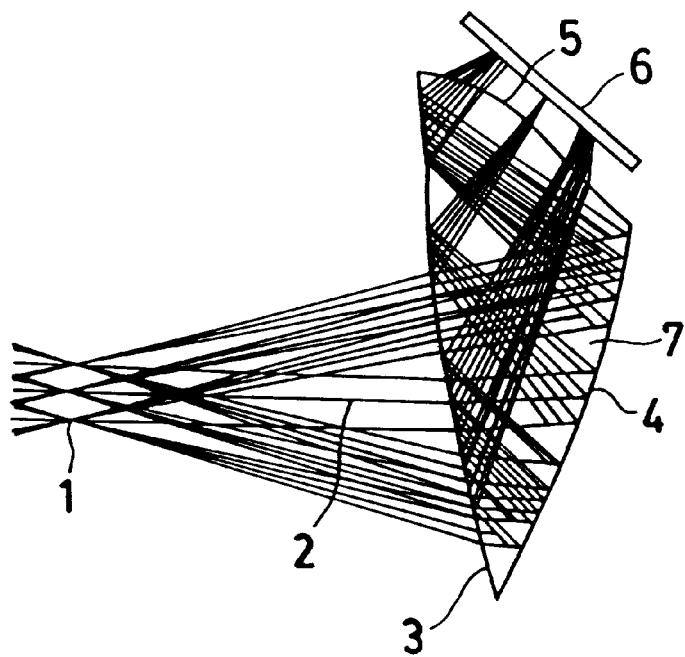
FIG. 4 is a sectional view showing an ocular optical system of an image display apparatus according to Example 4 of the present invention.
Figure 5:
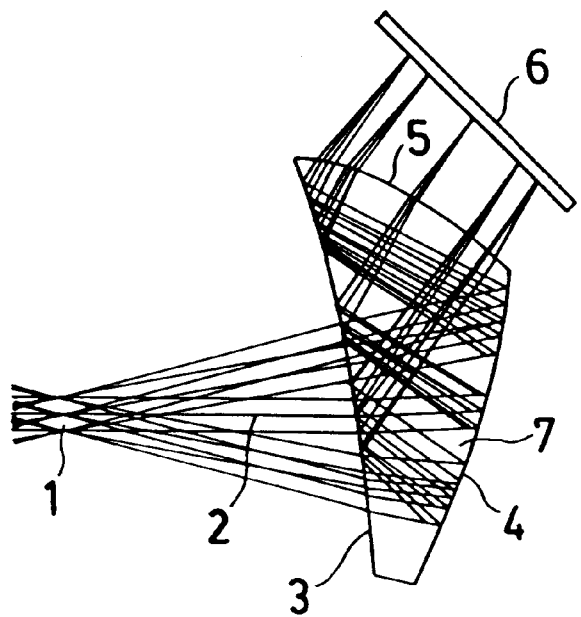
FIG. 5 is a sectional view showing an ocular optical system of an image display apparatus according to Example 5 of the present invention.
Figure 6:
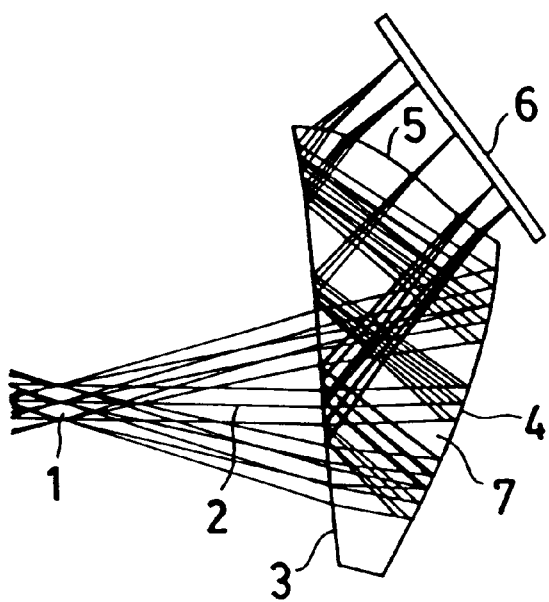
FIG. 6 is a sectional view showing an ocular optical system of an image display apparatus according to Example 6 of the present invention.
Figure 7:
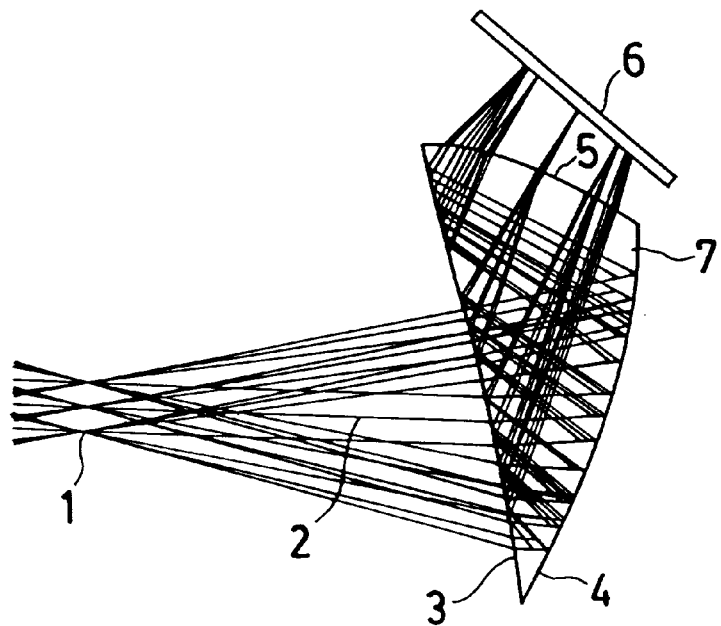
FIG. 7 is a sectional view showing an ocular optical system of an image display apparatus according to Example 7 of the present invention.
Figure 8:
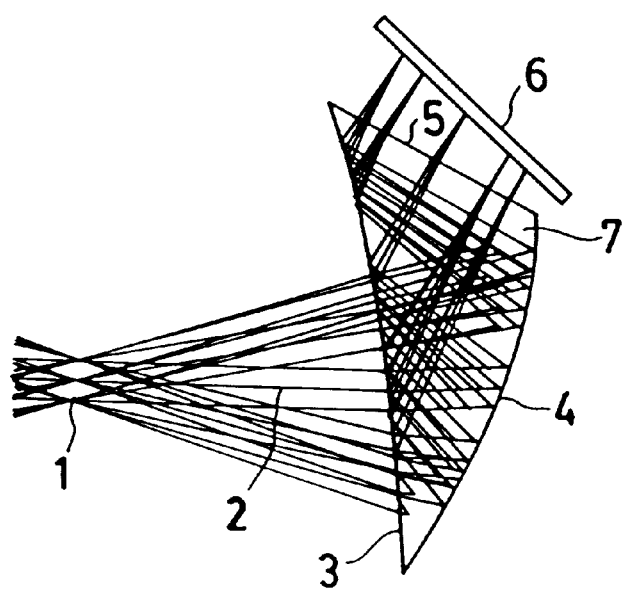
FIG. 8 is a sectional view showing one example of an ocular optical system used to explain the principle of the present invention.

Examples 1 to 7 of the image display apparatus according to the present invention will be described below. In constituent parameters of each example (described later), as shown in FIGS. 1 to 7, an exit pupil 1 of an ocular optical system 7 is defined as the origin of the optical system, and an optical axis 2 is defined by a light ray passing through both the center of the display area of an image display device 6 and the center (the origin) of the exit pupil 1. A Z-axis is taken in a direction in which light rays travel from the exit pupil 1 along the optical axis 2. A Y-axis is taken in a direction extending through the center of the exit pupil 1 at right angles to the Z-axis in a plane in which light rays are bent by the ocular optical system 7. An X-axis is taken in a direction extending through the center of the exit pupil 1 at right angles to both the Z- and Y-axes. A direction in which the Z-axis extends from the exit pupil 1 toward the ocular optical system 7 is defined as a positive direction of the Z-axis. A direction in which the Y-axis extends from the optical axis 2 toward the image display device 6 is defined as a positive direction of the Y-axis. A direction in which the X-axis constitutes a right-handed system in combination with the Z- and Y-axes is defined as a positive direction of the X-axis. It should be noted that ray tracing is carried out by backward ray tracing from the exit pupil 1 of the ocular optical system 7, which is defined as the object side, toward the image display device 6, which is defined as the image plane side.

Regarding each surface for which displacements Y and Z and tilt angle θ are shown, the displacement Y is a distance by which the surface is displaced in the Y-axis direction from the exit pupil 1, which is the origin of the optical system, while the displacement Z is a distance by which the surface is displaced in the Z-axis direction from the exit pupil 1, and the tilt angle θ is an angle of inclination with respect to the Z-axis. It should be noted that, for the tilt angle, the counterclockwise direction is defined as a positive direction. It should be noted that the surface separation in the constituent parameters is meaningless.

The configuration of an anamorphic surface is defined by the following equation. A straight line which passes through the origin of the surface configuration and which is perpendicular to the optical surface is defined as the axis of the anamorphic surface.

$$Z = (CX \cdot X^2 + CY \cdot Y^2) / [1 + \{1 - (1 + Kx)CX^2 \cdot X^2 - (1 + Ky)CY^2 \cdot Y^2\}^{1/2}] +$$

-continued
$$\sum (Rn((1-Pn)X^2 + (1+Pn)Y^2))^{(n+1)}$$

Assuming that n=4 (polynomial of degree 4), for example, the equation, when expanded, may be given by:

$$Z = (CX \cdot X^2 + CY \cdot Y^2)/[1 + \qquad (a)$$
$$\{1 - (1+Kx)CX^2 \cdot X^2 - (1+Ky)CY^2 \cdot Y^2\}^{1/2}] +$$
$$R1((1-P1)X^2 + (1+P1)Y^2)^2 + R2((1-P2)X^2 + (1+P2)Y^2)^3 +$$
$$R3((1-P3)X^2 + (1+P3)Y^2)^4 + R4((1-P4)X^2 + (1+P4)Y^2)^5$$

where Z is the amount of deviation from a plane tangent to the origin of the surface configuration; CX is the curvature in the X-axis direction; CY is the curvature in the Y-axis direction; Kx is the conical coefficient in the X-axis direction; Ky is the conical coefficient in the Y-axis direction; Rn is the rotationally symmetric component of the aspherical surface term; and Pn is the rotationally asymmetric component of the aspherical surface term. It should be noted that in the constituent parameters of the examples (described later), the following parameters are employed:

Rx: the radius of curvature in the X-axis direction
Ry: the radius of curvature in the Y-axis direction The curvature radii are related to the curvatures CX and CY as follows:

Rx=1/CX, Ry=1/CY

The configuration of a rotationally asymmetric surface is defined by the following equation. The Z-axis of the defining equation is the axis of the rotationally asymmetric surface.

$$Z = \Sigma_n \Sigma_m C_{nm} X^m Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry free-form surface (i.e. a rotationally asymmetric surface having only one plane of symmetry) is defined by the equation expressing a rotationally asymmetric surface, when a symmetry produced by the plane of symmetry is to be obtained in the direction X, all terms with odd-numbered powers of X are made zero (for example, the coefficients of the terms with odd-numbered powers of X are set equal to zero). To obtain a symmetry produced by the plane of symmetry in the direction Y, all terms with odd-numbered powers of Y are made zero (for example, the coefficients of the terms with odd-numbered powers of Y are set equal to zero).

Assuming that k=7 (polynomial of degree 7), for example, a plane-symmetry free-form surface which is symmetric with respect to the direction X is expressed by an expanded form of the above equation as follows:

$$Z = C_2 + C_3 y + C_4 x + C_5 y^2 + C_6 yx + C_7 x^2 + C_8 y^3 + \qquad (b)$$
$$C_9 y^2 + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7$$

In this equation, the coefficients ($C_4$, $C_6$, $C_9$, ...) of the terms with odd-numbered powers of X are set equal to zero. It should be noted that coefficients concerning aspherical surfaces which are not shown in the constituent parameters (shown later) are zero. The refractive index of a medium lying between surfaces is expressed by the refractive index for the spectral d-line (wavelength: 587.56 nanometers). Lengths are given in millimeters.

Plane-symmetry free-form surfaces may also be defined by Zernike polynomials. That is, the configuration of a plane-symmetry free-form surface may be defined by the following equation (c). The Z-axis of the defining equation (c) is the axis of Zernike polynomial.

$$X = R \times \cos(A) \qquad (b)$$
$$Y = R \times \sin(A)$$
$$Z = D_2 + D_3 R\cos(A) + D_4 R\sin(A) + D_5 R^2 \cos(2A) + D_6(R^2 - 1) +$$
$$D_7 R^2 \sin(2A) + D_8 R^3 \cos(3A) + D_9(3R^3 - 2R)\cos(A) +$$
$$D_{10}(3R^3 - 2R)\sin(A) + D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) + D_{17} R^5 \cos(5A) +$$
$$D_{18}(5R^5 - 4R^3)\cos(3A) + D_{19}(10R^5 - 12R^3 + 3R)\cos(A) +$$
$$D_{20}(10R^5 - 12R^3 + 3R)\sin(A) D_{21}(5R^5 - 4R^3)\sin(3A) +$$
$$D_{22} R^5 \sin(5A) + D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A)$$

It should be noted that the plane-symmetry free-form surface in the above equation is expressed as a surface which is symmetric with respect to the direction X. In the above equation, $D_m$ (m is an integer of 2 or higher) are coefficients.

As an example of other expressions of surfaces usable in the present invention, the above defining equation ($Z = \Sigma_n \Sigma_m C_{nm} X^m Y^{n-m}$) may be expanded to express a surface which is symmetric with respect to the direction X and in which k=7 and the coefficients of the terms with odd-numbered powers of X are set equal to zero ($C_4$, $C_6$, $C_9$ ... =0), as shown by the following equation (d) as in the case of the equation (b):

$$Z = C_2 + C_3 y + C_4|x| + C_5 y^2 + C_6 y|x| + C_7 x^2 + C_8 y^3 + C_9 y^2|x| + \qquad (d)$$
$$C_{10} yx^2 + C_{11}|x^3| + C_{12} y^4 + C_{13} y^3|x| + C_{14} y^2 x^2 + C_{15} y|x^3| +$$
$$C_{16} x^4 + C_{17} y^5 + C_{18} y^4|x| + C_{19} y^3 x^2 + C_{20} y^2|x^3| + C_{21} yx^4 +$$
$$C_{22} y|x^5| + C_{23} y^6 + C_{24} y^5|x| + C_{25} y^4 x^2 + C_{26} y^3|x^3| +$$
$$C_{27} y^2 x^4 + C_{28} y|x^5| + C_{29} x^6 + C_{30} y^7 + C_{31} y^6|x| + C_{32} y^5 x^2 +$$
$$C_{33} y^4|x^3| + C_{34} y^3 x^4 + C_{35} y^2|x^5| + C_{36} yx^6 + C_{37}|x^7|$$

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

The ocular optical system 7 in each of the following Examples 1 to 7 comprises three surfaces, and the space between the three surfaces is filled with a medium having a refractive index larger than 1.

In the ocular optical system 7 in each of Examples 1 to 7, display light from an image display device 6 enters the optical system 7 through a third surface 5 which is decentered transmitting surface facing the image display device 6. The incident light is reflected away from the exit pupil 1 by a first surface 3 facing the exit pupil 1 and serving as both reflecting and transmitting surfaces. The reflected light is reflected by a second surface 4 which is a reflecting surface facing both the exit pupil 1 and the first surface 3, which serves as both reflecting and transmitting surfaces. The reflected light exits from the optical system 7 through the first surface 3, which serves as both reflecting and transmitting surfaces. Then, the light travels along the optical axis 2 and enters an observer's pupil placed at the exit pupil 1, without forming an intermediate image, thus forming a display image on the retina of the observer's eye.

FIGS. 1 to 7 are sectional views of Examples 1 to 7, taken along the YZ-plane containing the optical axis 2.

The observation field angles of the ocular optical systems in Examples 1 to 7, i.e. the horizontal field angle (the field angle in the X-axis direction) and the vertical field angle (the field angle in the Y-axis direction), together with the pupil diameters, are as follows:

In Example 1, the horizontal field angle is 40.0 degrees; the vertical field angle is 30.57 degrees; and the pupil diameter is 4 millimeters.

In Example 2, the horizontal field angle is 38.0 degrees; the vertical field angle is 28.96 degrees; and the pupil diameter is 4 millimeters.

In Example 3, the horizontal field angle is 35.0 degrees; the vertical field angle is 26.60 degrees; and the pupil diameter is 4 millimeters.

In Example 4, the horizontal field angle is 42.0 degrees; the vertical field angle is 32.12 degrees; and the pupil diameter is 4 millimeters.

In Example 5, the horizontal field angle is 40.0 degrees; the vertical field angle is 30.57 degrees; and the pupil diameter is 4 millimeters.

In Example 6, the horizontal field angle is 45.0 degrees; the vertical field angle is 34.52 degrees; and the pupil diameter is 4 millimeters.

In Example 7, the horizontal field angle is 35.0 degrees; the vertical field angle is 26.60 degrees; and the pupil diameter is 4 millimeters.

Constituent parameters in the foregoing Examples 1 to 7 are shown below. In each table below, "FFS" denotes a free-form surface; "ANS" denotes an anamorphic surface; and "ZRS" denotes a Zernike polynomial surface.

Example 1

| Surface No. | Radius of curvature | Surface separation | Refractive index (Displacement) | Abbe's No. (Tilt angle) |
|---|---|---|---|---|
| 1 (pupil) | ∞ | | | |
| 2 (first surface) | FFS1 | | 1.5254 | 56.25 |
| (transmittig surface) | | | (from pupil position) | |
| | | | Y  18.093  θ | 7.31° |
| | | | Z  28.093 | |
| 3 (second surface) | FFS2 | | 1.5254 | 56.25 |
| (reflecting surface) | | | (from pupil position) | |
| | | | Y  0.319  θ | −21.42° |
| | | | Z  39.301 | |
| 4 (first surface) | FFS1 | | 1.5254 | 56.25 |
| (reflecting surface) | | | (from pupil position) | |
| | | | Y  18.093  θ | 7.31° |
| | | | Z  28.093 | |
| 5 (third surface) | FFS3 | | 1.0000 | 0.00 |
| (transmittig surface) | | | (from pupil position) | |
| | | | Y  21.007  θ | 60.28° |
| | | | Z  35.793 | |
| 6 (display plane) | ∞ | | (from pupil position) | |
| | | | Y  23.796  θ | 45.87° |
| | | | Z  37.786 | |

FFS1

| | | | | | |
|---|---|---|---|---|---|
| C5  | −3.8165 × 10$^{-3}$ | C7  | −5.1041 × 10$^{-3}$ | C8  | −2.5266 × 10$^{-4}$ |
| C10 | −6.6323 × 10$^{-5}$ | C12 | −7.2159 × 10$^{-6}$ | C14 | −6.0053 × 10$^{-7}$ |
| C16 | −4.3687 × 10$^{-6}$ | C17 | −6.1539 × 10$^{-8}$ | C19 | −3.0747 × 10$^{-8}$ |
| C21 | −2.8795 × 10$^{-7}$ | | | | |

FFS2

| | | | | | |
|---|---|---|---|---|---|
| C5  | −7.1431 × 10$^{-3}$ | C7  | −9.9210 × 10$^{-3}$ | C8  | −2.4433 × 10$^{-5}$ |
| C10 |  1.4451 × 10$^{-5}$ | C12 | −1.6195 × 10$^{-6}$ | C14 |  2.0812 × 10$^{-6}$ |
| C16 |  1.1224 × 10$^{-7}$ | C17 |  1.0309 × 10$^{-7}$ | C19 | −1.0399 × 10$^{-7}$ |
| C21 | −1.4563 × 10$^{-7}$ | | | | |

FFS3

| | | | | | |
|---|---|---|---|---|---|
| C5  | −1.9854 × 10$^{-2}$ | C7  | −2.9724 × 10$^{-2}$ | C8  | −9.8981 × 10$^{-5}$ |
| C10 |  6.9263 × 10$^{-4}$ | C12 | −4.6748 × 10$^{-5}$ | C14 |  1.0538 × 10$^{-4}$ |

-continued

| | | | | | | |
|---|---|---|---|---|---|---|
| C16 | $4.4448 \times 10^{-5}$ | C17 | $2.0494 \times 10^{-6}$ | C19 | $-2.6512 \times 10^{-6}$ | |
| C21 | $-2.4647 \times 10^{-6}$ | | | | | |

Example 2

| Surface No. | Radius of curvature | Surface separation | Refractive index (Displacement) | | Abbe's No. (Tilt angle) | |
|---|---|---|---|---|---|---|
| 1 (pupil) | ∞ | | | | | |
| 2 (first surface) | FFS1 | | 1.5254 | | 56.25 | |
| | | | (from pupil position) | | | |
| (transmittig surface) | | | Y | 9.991 | θ | 6.35° |
| | | | Z | 28.970 | | |
| 3 (second surface) | FFS2 | | 1.5254 | | 56.25 | |
| | | | (from pupil position) | | | |
| (reflecting surface) | | | Y | 0.312 | θ | -20.75° |
| | | | Z | 38.925 | | |
| 4 (first surface) | FFS1 | | 1.5254 | | 56.25 | |
| | | | (from pupil position) | | | |
| (reflecting surface) | | | Y | 9.991 | θ | 6.35° |
| | | | Z | 28.970 | | |
| 5 (third surface) | FFS3 | | 1.0000 | | 0.00 | |
| | | | (from pupil position) | | | |
| (transmittig surface) | | | Y | 19.918 | θ | 58.52° |
| | | | Z | 35.844 | | |
| 6 (display plane) | ∞ | | (from pupil position) | | | |
| | | | Y | 23.107 | θ | 42.68° |
| | | | Z | 38.090 | | |

FFS1

| | | | | | |
|---|---|---|---|---|---|
| C5 | $-1.7302 \times 10^{-3}$ | C7 | $-4.8152 \times 10^{-3}$ | C8 | $-1.2157 \times 10^{-4}$ |
| C10 | $-1.0047 \times 10^{-4}$ | C12 | $-3.4762 \times 10^{-6}$ | C14 | $-5.4078 \times 10^{-7}$ |
| C16 | $-1.8836 \times 10^{-6}$ | C17 | $-4.6447 \times 10^{-8}$ | C19 | $2.5784 \times 10^{-8}$ |
| C21 | $-2.0873 \times 10^{-7}$ | C23 | $3.8332 \times 10^{-10}$ | C25 | $-6.7009 \times 10^{-10}$ |
| C27 | $-2.2102 \times 10^{-9}$ | C29 | $-8.1647 \times 10^{-10}$ | | |

FFS2

| | | | | | |
|---|---|---|---|---|---|
| C5 | $-7.6128 \times 10^{-3}$ | C7 | $-9.8846 \times 10^{-3}$ | C8 | $-3.5644 \times 10^{-5}$ |
| C10 | $4.4154 \times 10^{-6}$ | C12 | $4.8183 \times 10^{-7}$ | C14 | $1.1991 \times 10^{-7}$ |
| C16 | $-1.2538 \times 10^{-6}$ | C17 | $-2.4892 \times 10^{-8}$ | C19 | $-3.9316 \times 10^{-8}$ |
| C21 | $-7.2362 \times 10^{-8}$ | C23 | $1.7469 \times 10^{-9}$ | C25 | $-5.6998 \times 10^{-9}$ |
| C27 | $3.3050 \times 10^{-11}$ | C29 | $-2.7530 \times 10^{-10}$ | | |

FFS3

| | | | | | |
|---|---|---|---|---|---|
| C5 | $-2.3435 \times 10^{-2}$ | C7 | $-2.4529 \times 10^{-2}$ | C8 | $-1.1009 \times 10^{-3}$ |
| C10 | $5.2475 \times 10^{-4}$ | C12 | $5.8555 \times 10^{-5}$ | C14 | $1.5152 \times 10^{-4}$ |
| C16 | $1.1480 \times 10^{-4}$ | C17 | $3.8188 \times 10^{-6}$ | C19 | $-3.3787 \times 10^{-6}$ |
| C21 | $-1.6733 \times 10^{-6}$ | C23 | $-3.2307 \times 10^{-7}$ | C25 | $7.2831 \times 10^{-8}$ |
| C27 | $-2.1094 \times 10^{-7}$ | C29 | $-3.2162 \times 10^{-7}$ | | |

Example 3

| Surface No. | Radius of curvature | Surface separation | Refractive index (Displacement) | | Abbe's No. (Tilt angle) | |
|---|---|---|---|---|---|---|
| 1 (pupil) | ∞ | | | | | |
| 2 (first surface) | FFS1 | | 1.5254 | | 56.25 | |
| | | | (from pupil position) | | | |
| (transmittig surface) | | | Y | 6.449 | θ | 15.84° |
| | | | Z | 32.516 | | |
| 3 (second surface) | FFS2 | | 1.5254 | | 56.25 | |
| | | | (from pupil position) | | | |
| (reflecting surface) | | | Y | 0.782 | θ | -14.27° |
| | | | Z | 43.673 | | |
| 4 (first surface) | FFS1 | | 1.5254 | | 56.25 | |
| | | | (from pupil position) | | | |
| (reflecting surface) | | | Y | 6.449 | θ | 15.84° |
| | | | Z | 32.516 | | |
| 5 (third surface) | FFS3 | | 1.0000 | | 0.00 | |
| | | | (from pupil position) | | | |
| (transmittig surface) | | | Y | 20.361 | θ | 80.31° |
| | | | Z | 37.064 | | |
| 6 (display plane) | ∞ | | (from pupil position) | | | |
| | | | Y | 24.568 | θ | 56.22° |
| | | | Z | 39.585 | | |

-continued

FFS1

| | | | | | |
|---|---|---|---|---|---|
| C5 | $-3.2633 \times 10^{-3}$ | C7 | $-2.8674 \times 10^{-3}$ | C8 | $-1.8028 \times 10^{-5}$ |
| C10 | $4.4880 \times 10^{-5}$ | C12 | $5.9053 \times 10^{-7}$ | C14 | $3.3532 \times 10^{-6}$ |
| C16 | $-1.7695 \times 10^{-6}$ | C17 | $-7.2737 \times 10^{-8}$ | C19 | $-1.0255 \times 10^{-7}$ |
| C21 | $-1.9604 \times 10^{-7}$ | C23 | $-1.5080 \times 10^{-9}$ | C25 | $-6.6866 \times 10^{-9}$ |
| C27 | $-5.6917 \times 10^{-9}$ | C29 | $-1.3917 \times 10^{-9}$ | | |

FFS2

| | | | | | |
|---|---|---|---|---|---|
| C5 | $-8.4065 \times 10^{-3}$ | C7 | $-8.6196 \times 10^{-3}$ | C8 | $2.6635 \times 10^{-5}$ |
| C10 | $3.1544 \times 10^{-5}$ | C12 | $-9.2342 \times 10^{-7}$ | C14 | 0.0000 |
| C16 | $-6.5370 \times 10^{-7}$ | C17 | $-3.7317 \times 10^{-8}$ | C19 | $-4.5906 \times 10^{-8}$ |
| C21 | $-2.7295 \times 10^{-8}$ | C23 | $4.9443 \times 10^{-9}$ | C25 | $-2.3766 \times 10^{-9}$ |
| C27 | $-2.4637 \times 10^{-9}$ | C29 | $-1.7034 \times 10^{-9}$ | | |

FFS3

| | | | | | |
|---|---|---|---|---|---|
| C5 | $-1.9502 \times 10^{-2}$ | C7 | $-1.0317 \times 10^{-2}$ | C8 | $9.2721 \times 10^{-4}$ |
| C10 | $1.4647 \times 10^{-3}$ | C12 | $2.3405 \times 10^{-5}$ | C14 | 0.0000 |
| C16 | 0.0000 | C17 | $-7.5660 \times 10^{-6}$ | C19 | $-1.0560 \times 10^{-5}$ |
| C21 | $-4.5094 \times 10^{-6}$ | C23 | $1.1597 \times 10^{-7}$ | C25 | $6.0398 \times 10^{-7}$ |
| C27 | $3.7657 \times 10^{-7}$ | C29 | $1.8098 \times 10^{-7}$ | | |

Example 4

| Surface No. | Radius of curvature | Surface separation | Refractive index (Displacement) | Abbe's No. (Tilt angle) |
|---|---|---|---|---|
| 1 (pupil) | ∞ | | | |
| 2 (first surface) | FFS1 | | 1.5254 | 56.25 |
| (transmittig surface) | | | (from pupil position) | |
| | | | Y 12.330 θ | 4.14° |
| | | | Z 28.617 | |
| 3 (second surface) | FFS2 | | 1.5254 | 56.25 |
| (reflecting surface) | | | (from pupil position) | |
| | | | Y 0.579 θ | −20.79° |
| | | | Z 40.622 | |
| 4 (first surface) | FFS1 | | 1.5254 | 56.25 |
| (reflecting surface) | | | (from pupil position) | |
| | | | Y 12.330 θ | 4.14° |
| | | | Z 28.617 | |
| 5 (third surface) | FFS3 | | 1.0000 | 0.00 |
| (transmittig surface) | | | (from pupil position) | |
| | | | Y 22.504 θ | 46.35° |
| | | | Z 36.191 | |
| 6 (display plane) | ∞ | | (from pupil position) | |
| | | | Y 24.395 θ | 45.95° |
| | | | Z 37.448 | |

FFS1

| | | | | | |
|---|---|---|---|---|---|
| C5 | $2.3063 \times 10^{-3}$ | C7 | $-5.7432 \times 10^{-3}$ | C8 | $-1.2708 \times 10^{-4}$ |
| C10 | $-1.8611 \times 10^{-4}$ | C12 | $-7.3886 \times 10^{-6}$ | C14 | $5.1153 \times 10^{-6}$ |
| C16 | $4.1947 \times 10^{-6}$ | C17 | $-2.8995 \times 10^{-7}$ | C19 | $4.7348 \times 10^{-7}$ |
| C21 | $-2.4373 \times 10^{-7}$ | C23 | $-4.7209 \times 10^{-9}$ | C25 | $8.5811 \times 10^{-9}$ |
| C27 | $-1.1873 \times 10^{-8}$ | C29 | $-7.4198 \times 10^{-9}$ | | |

FFS2

| | | | | | |
|---|---|---|---|---|---|
| C5 | $-5.2034 \times 10^{-3}$ | C7 | $-1.0108 \times 10^{-2}$ | C8 | $-1.4607 \times 10^{-4}$ |
| C10 | $-3.8674 \times 10^{-5}$ | C12 | $5.8323 \times 10^{-7}$ | C14 | $6.1187 \times 10^{-6}$ |
| C16 | $8.3113 \times 10^{-7}$ | C17 | $1.1469 \times 10^{-7}$ | C19 | $1.0138 \times 10^{-7}$ |
| C21 | $-8.2170 \times 10^{-8}$ | C23 | $5.9347 \times 10^{-9}$ | C25 | $-9.5587 \times 10^{-9}$ |
| C27 | $-6.0886 \times 10^{-9}$ | C29 | $3.2078 \times 10^{-9}$ | | |

FFS3

| | | | | | |
|---|---|---|---|---|---|
| C5 | $-2.0125 \times 10^{-2}$ | C7 | $-4.1701 \times 10^{-2}$ | C8 | $-1.9065 \times 10^{-3}$ |
| C10 | $-1.7714 \times 10^{-3}$ | C12 | $-3.0607 \times 10^{-5}$ | C14 | $3.0045 \times 10^{-4}$ |
| C16 | $1.3128 \times 10^{-4}$ | C17 | $-4.5761 \times 10^{-6}$ | C19 | $1.2470 \times 10^{-5}$ |
| C21 | $3.3448 \times 10^{-6}$ | C23 | $-3.8549 \times 10^{-7}$ | C25 | $-4.2473 \times 10^{-7}$ |
| C27 | $-9.1566 \times 10^{-7}$ | C29 | $-3.6298 \times 10^{-7}$ | | |

Example 5

| Surface No. | Radius of curvature | Surface separation | Refractive index (Displacement) | Abbe's No. (Tilt angle) |
|---|---|---|---|---|
| 1 (pupil) | ∞ | | | |
| 2 (first surface) | FFS1 | | 1.5254 | 56.25 |

-continued

| Surface No. | Radius of curvature | Surface separation | Refractive index (Displacement) | Abbe's No. (Tilt angle) |
|---|---|---|---|---|
| | | | (from pupil position) | |
| (transmittig surface) | | | Y   −22.942  θ | 4.12° |
| | | | Z   35.598 | |
| 3 (second surface) | FFS2 | | 1.5254 | 56.25 |
| | | | (from pupil position) | |
| (reflecting surface) | | | Y   0.723  θ | −15.12° |
| | | | Z   47.882 | |
| 4 (first surface) | FFS1 | | 1.5254 | 56.25 |
| | | | (from pupil position) | |
| (reflecting surface) | | | Y   −22.942  θ | 4.12° |
| | | | Z   35.598 | |
| 5 (third surface) | FFS3 | | 1.0000 | 0.00 |
| | | | (from pupil position) | |
| (transmittig surface) | | | Y   25.082  θ | 61.37° |
| | | | Z   40.304 | |
| 6 (display plane) | ∞ | | (from pupil position) | |
| | | | Y   34.412  θ | 45.82° |
| | | | Z   47.203 | |

FFS1

| C5  | $-8.0312 \times 10^{-4}$ | C7  | $-7.3254 \times 10^{-4}$ | C8  | $-2.1186 \times 10^{-5}$ |
| C10 | $-1.0171 \times 10^{-4}$ | C12 | $-3.8652 \times 10^{-8}$ | C14 | $2.3621 \times 10^{-6}$ |
| C16 | $-1.0931 \times 10^{-6}$ | C17 | $1.0643 \times 10^{-9}$  | C19 | $-1.5119 \times 10^{-8}$ |
| C21 | $-4.1144 \times 10^{-9}$ | | | | |

FFS2

| C5  | $-5.6208 \times 10^{-3}$ | C7  | $-5.4596 \times 10^{-3}$ | C8  | $1.7809 \times 10^{-5}$ |
| C10 | $9.8706 \times 10^{-6}$  | C12 | $-1.3336 \times 10^{-7}$ | C14 | $-5.2841 \times 10^{-7}$ |
| C16 | $-8.9471 \times 10^{-7}$ | C17 | $-7.0627 \times 10^{-9}$ | C19 | $-1.8241 \times 10^{-8}$ |
| C21 | $9.0696 \times 10^{-9}$  | | | | |

FFS3

| C5  | $-1.6793 \times 10^{-2}$ | C7  | $-7.9978 \times 10^{-3}$ | C8  | $-6.9505 \times 10^{-5}$ |
| C10 | $1.9267 \times 10^{-4}$  | C12 | $1.6915 \times 10^{-5}$  | C14 | $3.5749 \times 10^{-5}$ |
| C16 | $1.4671 \times 10^{-5}$  | C17 | $-1.8479 \times 10^{-7}$ | C19 | $-5.4557 \times 10^{-7}$ |
| C21 | $-4.2253 \times 10^{-7}$ | | | | |

Example 6

| Surface No. | Radius of curvature | Surface separation | Refractive index (Displacement) | Abbe's No. (Tilt angle) |
|---|---|---|---|---|
| 1 (pupil) | ∞ | | | |
| 2 (first surface) | FFS1 | | 1.5254 | 56.25 |
| | | | (from pupil position) | |
| (transmittig surface) | | | Y   −6.157  θ | 4.26° |
| | | | Z   30.427 | |
| 3 (second surface) | FFS2 | | 1.5254 | 56.25 |
| | | | (from pupil position) | |
| (reflecting surface) | | | Y   0.344  θ | −19.07° |
| | | | Z   45.620 | |
| 4 (first surface) | FFS1 | | 1.5254 | 56.25 |
| | | | (from pupil position) | |
| (reflecting surface) | | | Y   −6.157  θ | 4.26° |
| | | | Z   30.427 | |
| 5 (third surface) | FFS3 | | 1.0000 | 0.00 |
| | | | (from pupil position) | |
| (transmittig surface) | | | Y   25.914  θ | 51.68° |
| | | | Z   40.543 | |
| 6 (display plane) | ∞ | | (from pupil position) | |
| | | | Y   30.565  θ | 34.97° |
| | | | Z   45.343 | |

FFS1

| C5  | $7.6654 \times 10^{-4}$  | C7  | $-3.5475 \times 10^{-3}$ | C8  | $1.9585 \times 10^{-5}$ |
| C10 | $1.6023 \times 10^{-5}$  | C12 | $-1.4070 \times 10^{-6}$ | C14 | $5.0587 \times 10^{-7}$ |
| C16 | $-3.1469 \times 10^{-9}$ | C17 | $2.0302 \times 10^{-9}$  | C19 | $-3.1226 \times 10^{-8}$ |
| C21 | $-5.4209 \times 10^{-8}$ | | | | |

FFS2

| C5  | $-4.9320 \times 10^{-3}$ | C7  | $-6.5688 \times 10^{-3}$ | C8  | $-1.8179 \times 10^{-5}$ |
| C10 | $2.5798 \times 10^{-5}$  | C12 | $2.5039 \times 10^{-7}$  | C14 | $-8.6018 \times 10^{-7}$ |

-continued

| | | | | | |
|---|---|---|---|---|---|
| C16 | $-6.8890 \times 10^{-7}$ | C17 | $1.3653 \times 10^{-8}$ | C19 | $-8.6654 \times 10^{-9}$ |
| C21 | $-1.2045 \times 10^{-8}$ | | | | |

FFS3

| | | | | | |
|---|---|---|---|---|---|
| C5 | $-1.6523 \times 10^{-2}$ | C7 | $-1.5234 \times 10^{-2}$ | C8 | $-6.4396 \times 10^{-4}$ |
| C10 | $1.5353 \times 10^{-4}$ | C12 | $3.9841 \times 10^{-5}$ | C14 | $5.1973 \times 10^{-5}$ |
| C16 | $2.4054 \times 10^{-5}$ | C17 | $-1.4491 \times 10^{-6}$ | C19 | $-1.5381 \times 10^{-6}$ |
| C21 | $-7.3927 \times 10^{-7}$ | | | | |

Example 7

| Surface No. | Radius of curvature | Surface separation | Refractive index (Displacement) | | Abbe's No. (Tilt angle) |
|---|---|---|---|---|---|
| 1 (pupil) | ∞ | | | | |
| 2 (first surface) | ANS | | 1.5254 | | 56.25 |
| | | | (from pupil position) | | |
| (transmittig surface) | | | Y | 21.227 θ | 26.99° |
| | | | Z | 17.407 | |
| Ry | −184.630 | | | | |
| Rx | −132.495 | | | | |
| Ky | −55.0420 | | | | |
| Kx | −75.7723 | | | | |
| R1 | $-4.4928 \times 10^{-8}$ | | | | |
| R2 | $4.1997 \times 10^{-12}$ | | | | |
| R3 | $3.2102 \times 10^{-16}$ | | | | |
| R4 | $-4.8157 \times 10^{-19}$ | | | | |
| P1 | −1.0235 | | | | |
| P2 | $8.5660 \times 10^{-1}$ | | | | |
| P3 | $-3.9343 \times 10^{-1}$ | | | | |
| P4 | 1.0141 | | | | |
| 3 (second surface) | ZRS | | 1.5254 | | 56.25 |
| | | | (from pupil position) | | |
| (reflecting surface) | | | Y | 0.698 θ | −41.99° |
| | | | Z | 41.754 | |
| 4 (first surface) | ANS | | 1.5254 | | 56.25 |
| | | | (from pupil position) | | |
| (reflecting surface) | | | Y | 21.227 θ | 26.99° |
| | | | Z | 17.407 | |
| Ry | −184.630 | | | | |
| Rx | −132.495 | | | | |
| Ky | −55.0420 | | | | |
| Kx | −75.7723 | | | | |
| R1 | $-4.4928 \times 10^{-8}$ | | | | |
| R2 | $4.1997 \times 10^{-12}$ | | | | |
| R3 | $3.2102 \times 10^{-16}$ | | | | |
| R4 | $-4.8157 \times 10^{-19}$ | | | | |
| P1 | −1.0235 | | | | |
| P2 | $8.5660 \times 10^{-1}$ | | | | |
| P3 | $-3.9343 \times 10^{-1}$ | | | | |
| P4 | 1.0141 | | | | |
| 5 (third surface) | ANS | | 1.0000 | | 0.00 |
| | | | (from pupil position) | | |
| (transmittig surface) | | | Y | 20.647 θ | 36.34° |
| | | | Z | 71.142 | |
| Ry | −23.980 | | | | |
| Rx | −18.844 | | | | |
| Ky | −9.3115 | | | | |
| Kx | −12.6127 | | | | |
| R1 | $9.3378 \times 10^{-8}$ | | | | |
| R2 | $3.8711 \times 10^{-9}$ | | | | |
| R3 | $-1.8242 \times 10^{-12}$ | | | | |
| R4 | $-1.5707 \times 10^{-13}$ | | | | |
| P1 | 6.6055 | | | | |
| P2 | −1.1245 | | | | |
| P3 | −2.7869 | | | | |
| P4 | $5.1046 \times 10^{-1}$ | | | | |
| 6 (display plane) | ∞ | | | | |
| | | | (from pupil position) | | |
| | | | Y | 25.667 θ | 52.60° |
| | | | Z | 39.317 | |

ZRS

| | | | | | |
|---|---|---|---|---|---|
| C1 | 1.000 | C4 | $-4.9388 \times 10^{-1}$ | C5 | $5.0869 \times 10^{-4}$ |
| C6 | $-4.7886 \times 10^{-3}$ | C10 | $-2.2218 \times 10^{-5}$ | C11 | $-8.5910 \times 10^{-9}$ |
| C12 | $-5.5472 \times 10^{-8}$ | C13 | $2.0828 \times 10^{-8}$ | C14 | $-2.1213 \times 10^{-8}$ |

Values of parameters concerning the conditions (1-1) to (13-1) in each of Examples 1 to 7 of the present invention are shown in Table 2 below.

TABLE 2

|  |  | Ex.1 | Ex.2 | Ex.3 | Ex.4 |
|---|---|---|---|---|---|
| (1-1) | DX4 | s2 | -0.2604 | -0.2574 | -0.2234 | -0.2683 |
| (2-1) | DX5 | s2 | -0.2539 | -0.2489 | -0.2253 | -0.2598 |
| (3-1) | DX6 | s2 | -0.2364 | -0.2430 | -0.2326 | 0.2335 |
| (4-1) | DX5A | s3 | -0.1042 | -0.0988 | -0.0655 | -0.1090 |
| (5-1) | \|DX5A-DX4A\| | s3 | 0.0284 | 0.0287 | 0.0004 | 0.0335 |
| (6-1) | \|DX5A-DX6A\| | s3 | 0.0372 | 0.0297 | 0.0041 | 0.0686 |
| (7-1) | DY6-DY4 | s2 | 0.3039 | 0.3031 | 0.3511 | 0.1955 |
| (8-1) | DY3-DY1 | s2 | 0.3179 | 0.2971 | 0.3453 | 0.2177 |
| (9-1) | DY6A-DY4A | s3 | 0.0717 | 0.0970 | 0.1520 | -0.0817 |
| (10-1) | DY3A-DY1A | s3 | 0.0729 | 0.0925 | 0.1549 | -0.0596 |
| (11-1) | DY6A-DY2A | s3 | -0.0029 | -0.0021 | 0.0669 | -0.1353 |
| (12-1) | DY4A-DY2A | s3 | -0.0746 | -0.0991 | -0.0851 | -0.0536 |
| (13-1) | CX3/CX1 | s4 | 1.45 | 1.55 | 8.30 | 0.71 |
|  | CX6/CX4 | s4 | -0.47 | 14.15 | 2.47 | 1.73 |
|  | CY3/CY1 | s4 | 1.25 | 0.24 | 0.48 | -0.22 |
|  | CY6/CY4 | s4 | 0.85 | -0.52 | -1.11 | 0.06 |

|  |  | Ex.5 | Ex.6 | Ex.7 |
|---|---|---|---|---|
| (1-1) | DX4 | s2 | -0.1879 | -0.2246 | -0.2315 |
| (2-1) | DX5 | s2 | -0.1813 | -0.2273 | -0.2181 |
| (3-1) | DX6 | s2 | -0.1795 | -0.2391 | -0.2036 |
| (4-1) | DX5A | s3 | -0.0684 | -0.1010 | -0.0461 |
| (5-1) | \|DX5A-DX4A\| | s3 | 0.0054 | 0.0193 | 0.0089 |
| (6-1) | \|DX5A-DX6A\| | s3 | 0.0030 | 0.0034 | 0.0087 |
| (7-1) | DY6-DY4 | s2 | 0.2858 | 0.2659 | 0.3523 |
| (8-1) | DY3-DY1 | s2 | 0.2794 | 0.2537 | 0.3527 |
| (9-1) | DY6A-DY4A | s3 | 0.1484 | 0.1181 | 0.0380 |
| (10-1) | DY3A-DY1A | s3 | 0.1566 | 0.1031 | 0.0360 |
| (11-1) | DY6A-DY2A | s3 | 0.0659 | -0.0015 | 0.0101 |
| (12-1) | DY4A-DY2A | s3 | -0.0825 | -0.1196 | -0.0279 |
| (13-1) | CX3/CX1 | s4 | 2.50 | 1.28 | 1.07 |
|  | CX6/CX4 | s4 | 1.81 | 2.98 | 0.84 |
|  | CY3/CY1 | s4 | 0.12 | -2.03 | 1.20 |
|  | CY6/CY4 | s4 | -1.58 | -2.09 | 0.83 |

Although the ocular optical systems in the above examples use anamorphic surfaces, free-form surfaces and Zernike polynomial surfaces defined by the above defining equations (a), (b) and (c), it is possible to design an ocular optical system using a surface configuration defined by the defining equation (d). In other words, curved surfaces defined by any defining equation can be used in the present invention. No matter which defining equation is used, an ocular optical system which is extremely favorably corrected for aberrations can be obtained by satisfying any or some of the conditions shown in the present invention. It should be noted that conditional expressions which are used in conventional non-decentered systems, e.g. those for the curvature of a surface defined on the basis of the center of a coordinate system for defining a surface in which decentration is ignored, and those for the focal length of a surface, are meaningless in a case where each surface is decentered to a considerable extent as in the present invention.

Figure 9:
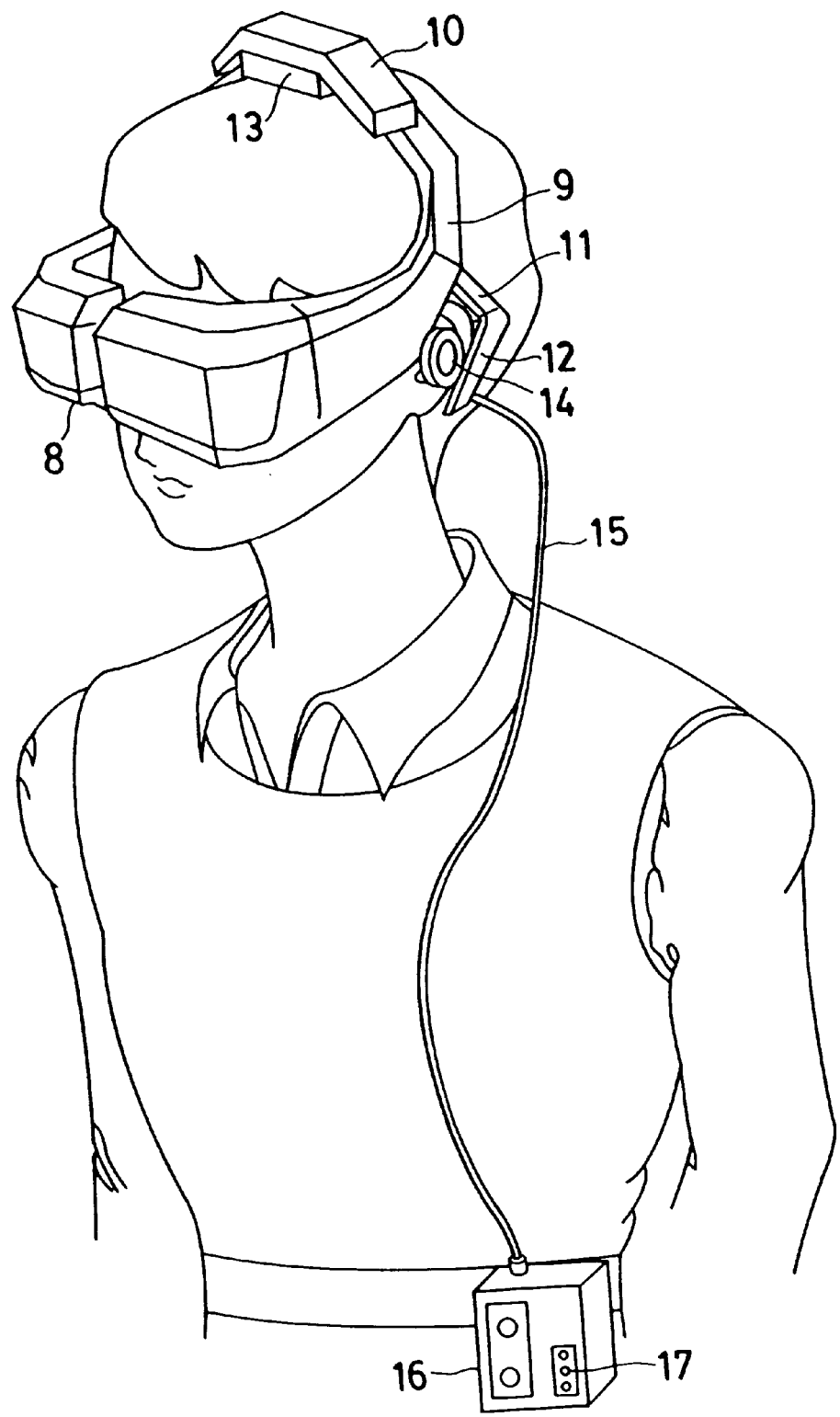
FIG. 9 is a diagram showing the whole arrangement of one example of a head-mounted image display apparatus according to the present invention.
Figure 10:
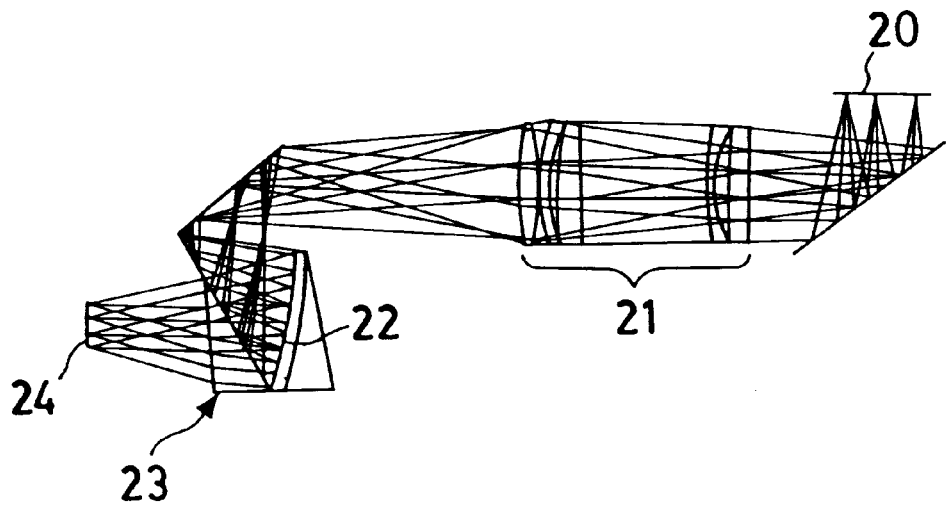
FIGS. 10(a) and 10(b) are diagrams showing an optical system of a conventional image display apparatus.
Figure 10:
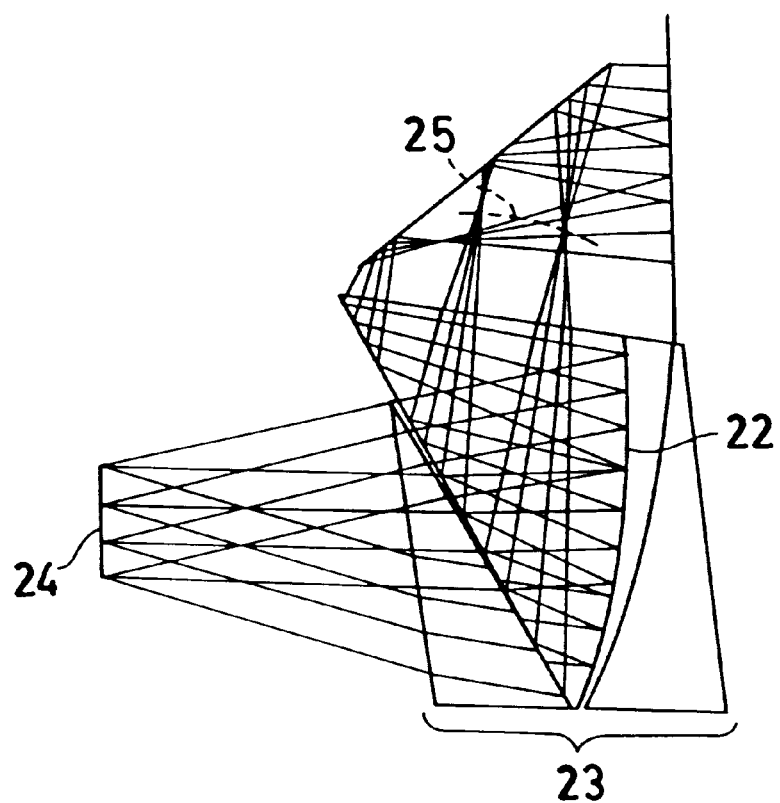
Figure 13:
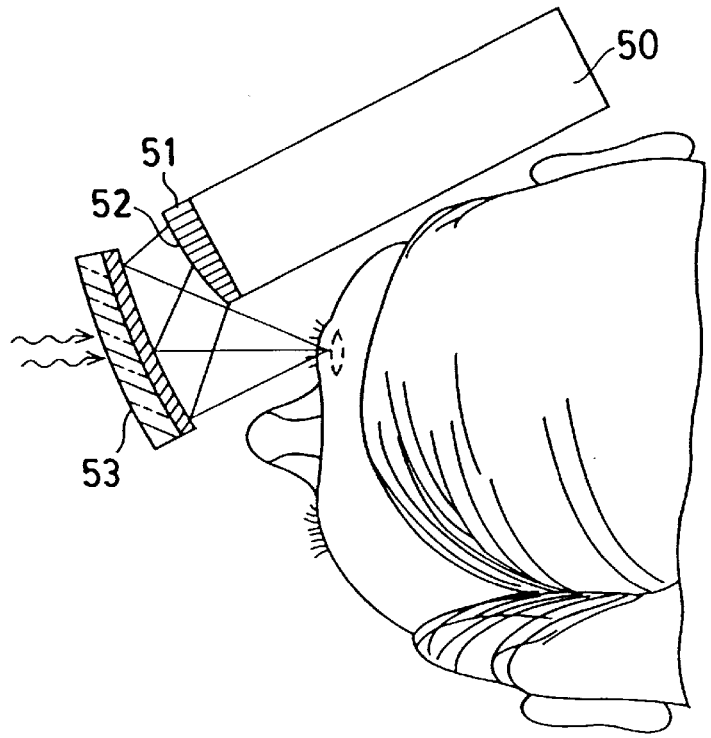
FIG. 13 is a diagram showing an optical system of a conventional image display apparatus.
Figure 14:
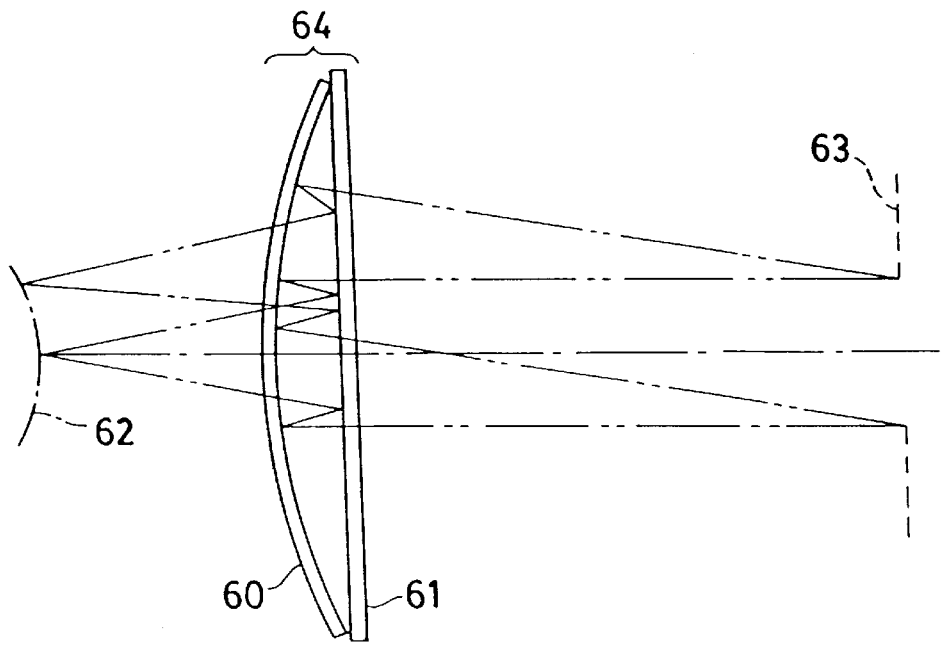
FIG. 14 is a diagram showing an optical system of a conventional image display apparatus.

It should be noted that it is possible to form a stationary or portable image display apparatus, such as a head-mounted image display apparatus, which enables the observer to see with both eyes by preparing a pair of combinations of an ocular optical system according to the present invention, arranged as described above, and an image display device for the left and right eyes, and supporting them apart from each other by the interpupillary distance, i.e. the distance between the two eyes. FIG. 9 shows the whole arrangement of an example of such a portable image display apparatus. A display apparatus body unit 8 contains a pair of left and right ocular optical systems such as those described above, and image display devices comprising liquid crystal display devices are disposed at the respective image planes of the two ocular optical systems. The apparatus body unit 8 is provided with a pair of left and right temporal frames 9 which are contiguous with the left and right ends of the apparatus body unit 8, as illustrated in the figure. The two temporal frames 9 are connected by a top frame 10. In addition, a rear frame 12 is attached to the intermediate portion of each temporal frame 9 through a leaf spring 11. Thus, by applying the rear frames 12 to the rear portions of the observer's ears like the temples of a pair of glasses and placing the top frame 10 on the top of the observer's head, the display apparatus body unit 8 can be held in front of the observer's eyes. It should be noted that a top pad 13, which is an elastic material such as a sponge, is attached to the inner side of the top frame 10, and a similar pad is attached to the inner side of each rear frame 12, thereby allowing the user to wear the display apparatus on his or her head without feeling uncomfortable.

Further, a speaker 14 is provided on each rear frame 12 to enable the user to enjoy listening to stereophonic sound in addition to image observation. The display apparatus body unit 8 having the speakers 14 is connected with a replaying unit 16, e.g. a portable video cassette unit, through an image and sound transmitting cord 15. Therefore, the user can enjoy not only observing an image but also listening to sound with the replaying unit 16 retained on a desired position, e.g. a belt, as illustrated in the figure. Reference numeral 17 in the figure denotes a switch and volume control part of the replaying unit 16. It should be noted that the top frame 10 contains electronic parts such as image and sound processing circuits.

The cord 15 may have a jack and plug arrangement attached to the distal end thereof so that the cord 15 can be detachably connected to an existing video deck. The cord 15 may also be connected to a TV signal receiving tuner so as to enable the user to enjoy watching TV. Alternatively, the cord 15 may be connected to a computer to receive computer graphic images or message images or the like from the computer. To eliminate the bothersome cord, the image display apparatus may be arranged to receive external radio signals through an antenna connected thereto.

As will be clear from the foregoing description, the present invention makes it possible to provide a head-mounted image display apparatus capable of providing an observation image which is clear and has minimal distortion even when an ocular optical system having a decentered reflecting surface is arranged to provide a wide observation field angle.

What we claim is:

1. In an image display apparatus comprising an image display device and an ocular optical system for leading an image formed by said image display device to a position of an eyeball of an observer without forming an intermediate image for observing the image observed as a virtual image, the improvement wherein said ocular optical system includes at least two reflecting surfaces which are decentered and have a refracting power, and wherein, of said at least two reflecting surfaces, a reflecting surface having a strongest refracting power is formed from a rotationally asymmetric surface having not more than two planes of symmetry, said rotationally asymmetric surface having a configuration which satisfies the following conditions:

$$-0.80 < DX4 < -0.20 (1/\text{mm}) \quad (1\text{-}1)$$

$$-0.80 < DX5 < -0.20 (1/\text{mm}) \quad (2\text{-}1)$$

$$-0.80 < DX6 < -0.20 (1/\text{mm}) \quad (3\text{-}1)$$

where DX4, DX6, DY1 and DX3 are tilts in a X-axis direction at respective positions on said reflecting surface at which principal rays 104, 105 and 106 are reflected by said reflecting surface, said principal rays 104, 105 and 106 being defined such that, with respect to an image display area of said image display device, a principal ray corresponding to an upper-right corner of the image display area where field angles in both X- and Y-axis directions are maximums is defined as 104, and a principal ray corresponding to a center of a right-hand edge of the image display area where a field angle in the X-axis direction is a maximum and a field angle in the Y-axis direction is zero is defined as 105, and further a principal ray corresponding to a lower-right corner of the image display area where a field angle in the X-axis direction is a maximum and a field angle in the Y-axis direction is a minimum (a maximum in a negative direction) is defined as 106.

2. In an image display apparatus comprising an image display device and an ocular optical system for leading an image formed by said image display device to a position of an eyeball of an observer without forming an intermediate image for observing the image observed as a virtual image, the improvement wherein said ocular optical system includes at least two reflecting surfaces which are decentered and have a refracting power, and wherein, of said at least two reflecting surfaces, at least one reflecting surface other than a reflecting surface having a strongest refracting power is formed from a rotationally asymmetric surface having not more than two planes of symmetry, said rotationally asymmetric surface having a configuration which satisfies the following conditions:

$$-0.120 < DX5A < -0.095 (1/mm) \quad (4\text{-}1)$$

$$|DX5A - DX4A| < 0.05 (1/mm) \quad (5\text{-}1)$$

$$|DX5A - DX6A| < 0.05 (1/mm) \quad (6\text{-}1)$$

where DX4A, DX5A and DX6A are tilts in an X-axis direction at respective positions on said reflecting surface at which principal rays 104, 105 and 106 are reflected by said reflecting surface, said principal rays 104, 105 and 106 being defined such that, with respect to an image display area of said image display device, a principal ray corresponding to an upper-right corner of the image display area where field angles in both X- and Y-axis directions are maximums is defined as 104, and a principal ray corresponding to a center of a right-hand edge of the image display area where a field angle in the X-axis direction is a maximum and a field angle in the Y-axis direction is zero is defined as 105, and further a principal ray corresponding to a lower-right corner of the image display area where a field angle in the X-axis direction is a maximum and a field angle in the Y-axis direction is a minimum (a maximum in a negative direction) is defined as 106, and where neither |DX5A−DX4A| nor |DX5A−DX6A| includes zero.

3. In an image display apparatus comprising an image display device and an ocular optical system for leading an image formed by said image display device to a position of an eyeball of an observer without forming an intermediate image for observing the image observed as a virtual image, the improvement wherein said ocular optical system includes at least two reflecting surfaces which are decentered and have a refracting power, and wherein, of said at least two reflecting surfaces, a reflecting surface having a strongest refracting power is formed from a rotationally asymmetric surface having not more than two planes of symmetry, said rotationally asymmetric surface having a configuration which satisfies the following conditions:

$$0.26 < DY6 - DY4 < 0.40 (1/mm) \quad (7\text{-}1)$$

$$0.19 < DY3 - DY1 < 0.38 (1/mm) \quad (8\text{-}1)$$

where DY4, DY6, DY1 and DY3 are tilts in a Y-axis direction at respective positions on said reflecting surface at which principal rays 104, 106, 101 and 103 are reflected by said reflecting surface, said principal rays 104, 106, 101 and 103 being defined such that, with respect to an image display area of said image display device, a principal ray corresponding to an upper-right corner of the image display area where field angles in both X- and Y-axis directions are maximums is defined as 104, and a principal ray corresponding to a lower-right corner of the image display area where a field angle in the X-axis direction is a maximum and a field angle in the Y-axis direction is a minimum (a maximum in a negative direction) is defined as 106, and further a principal ray corresponding to a center of an upper edge of the image display area where a field angle in the X-axis direction is zero and a field angle in the Y-axis direction is a maximum is defined as 101, and further a principal ray corresponding to a center of a lower edge of the image display area where a field angle in the X-axis direction is zero and a field angle in the Y-axis direction is a minimum is defined as 103.

4. In an image display apparatus comprising an image display device and an ocular optical system for leading an image formed by said image display device to a position of an eyeball of an observer without forming an intermediate image for observing the image observed as a virtual image, the improvement wherein said ocular optical system includes at least two reflecting surfaces which are decentered and have a refracting power, and wherein, of said at least two reflecting surfaces, at least one reflecting surface other than a reflecting surface having a strongest refracting power is formed from a rotationally asymmetric surface having not more than two planes of symmetry, said rotationally asymmetric surface having a configuration which satisfies the following conditions:

$$0.05 < DY6A - DY4A < 0.20 (1/mm) \quad (9\text{-}1)$$

$$0.05 < DY3A - DY1A < 0.20 (1/mm) \quad (10\text{-}1)$$

where DY1A, DY3A, DY4A and DY6A are tilts in a Y-axis direction at respective positions of said reflecting surface at which principal rays 101, 103, 104 and 106 are reflected by said reflecting surface, said principal rays 101, 103, 104 and 106 being defined such that, with respect to an image display area of said image display device, a principal ray corresponding to a center of an upper edge of the image display area where a field angle in an X-axis direction is zero and a field angle in the Y-axis direction is a maximum is defined as 101, and a principal ray corresponding to an upper-right corner of the image display area where field angles in both the X- and Y-axis directions are maximums is defined as 104, and further a principal ray corresponding to a lower-right corner of the image display area where a field angle in the X-axis direction is a maximum and a field angle in the Y-axis direction is a minimum (a maximum in a negative direction) is defined as 106, and further a principal ray corresponding to a center of a lower edge of the image display area where a field angle in the X-axis direction is zero and a field angle in the Y-axis direction is a minimum is defined as 103.

5. In an image display apparatus comprising an image display device and an ocular optical system for leading an image formed by said image display device to a position of an eyeball of an observer without forming an intermediate image for observing the image observed as a virtual image, the improvement wherein said ocular optical system includes at least two reflecting surfaces which are decentered and have a refracting power, and wherein, of said at least two reflecting surfaces, at least one reflecting surface other than a reflecting surface having a strongest refracting power is formed from a rotationally asymmetric surface having not more than two planes of symmetry, said rotationally asymmetric surface having a configuration which satisfies the following conditions:

$$-0.05 < DY6A - DY2A < 0.05 (1/mm) \quad (11\text{-}1)$$

$$-0.15 < DY4A - DY2A < -0.05 (1/mm) \quad (12\text{-}1)$$

where DY2A, DY4A and DY6A are tilts in a Y-axis direction at respective positions of said reflecting surface at which principal rays 102, 104 and 106 are reflected by said reflecting surface, said principal rays 102, 104 and 106 being defined such that, with respect to an image display area of said image display device, an axial principal ray corresponding to a center of the image display area where field angles in both X- and Y-axis directions are zero is defined as 102, and a principal ray corresponding to an upper-right corner of the image display area where field angles in both the X- and Y-axis directions are maximums is defined as 104, and further a principal ray corresponding to a lower-right corner of the image display area where a field angle in the X-axis direction is a maximum and a field angle in the Y-axis direction is a minimum (a maximum in a negative direction) is defined as 106.

6. In an image display apparatus comprising an image display device and an ocular optical system for leading an image formed by said image display device to a position of an eyeball of an observer without forming an intermediate image for observing the image observed as a virtual image, the improvement wherein said ocular optical system includes at least two reflecting surfaces which are decentered and have a refracting power, and further has a transmitting surface disposed to face said image display device, and wherein at least one of said at least two reflecting surfaces is formed from a rotationally asymmetric surface having not more than two planes of symmetry, and wherein said transmitting surface is formed from a rotationally asymmetric surface having not more than two planes of symmetry, said rotationally asymmetric surface having a configuration which satisfies the following condition:

$$1.5 < |CXY| < 100 \quad (13\text{-}1)$$

where CXY is at least one of values of CX3/CX1, CX6/CX4, CY3/CY1 and CY6/CY4, wherein CY1, CY3, CY4 and CY6 are curvatures in a Y-axis direction and CX1, CX3, CX4 and CX6 are curvatures in an X-axis direction at respective positions on said transmitting surface at which principal rays 101, 103, 104 and 106 pass through said transmitting surface, said principal rays 101, 103, 104 and 106 being defined such that, with respect to an image display area of said image display device, a principal ray corresponding to a center of an upper edge of the image display area where a field angle in the X-axis direction is zero and a field angle in the Y-axis direction is a maximum is defined as 101, and a principal ray corresponding to an upper-right corner of the image display area where field angles in both the X- and Y-axis directions are maximums is defined as 104, and further a principal ray corresponding to a lower-right corner of the image display area where a field angle in the X-axis direction is a maximum and a field angle in the Y-axis direction is a minimum (a maximum in a negative direction) is defined as 106, and further a principal ray corresponding to a center of a lower edge of the image display area where a field angle in the X-axis direction is zero and a field angle in the Y-axis direction is a minimum is defined as 103.

7. An image display apparatus according to claim 1, wherein a reflecting surface other than said reflecting surface having a strongest refracting power is formed from a rotationally asymmetric surface having not more than two planes of symmetry, said rotationally asymmetric surface having a configuration which satisfies the following conditions:

$$-0.120 < DX5A < -0.095 (1/mm) \quad (4\text{-}1)$$

$$|DX5A - DX4A| < 0.05 (1/mm) \quad (5\text{-}1)$$

$$|DX5A - DX6A| < 0.05 (1/mm) \quad (6\text{-}1)$$

where DX4A, DX5A and DX6A are tilts in the X-axis direction at respective positions on said reflecting surface at which principal rays 104, 105 and 106 are reflected by said reflecting surface, said principal rays 104, 105 and 106 being defined such that, with respect to an image display area of said image display device, a principal ray corresponding to an upper-right corner of the image display area where field angles in both the X- and Y-axis directions are maximums is defined as 104, and a principal ray corresponding to a center of a right-hand edge of the image display area where a field angle in the X-axis direction is a maximum and a field angle in the Y-axis direction is zero is defined as 105, and further a principal ray corresponding to a lower-right corner of the image display area where a field angle in the X-axis direction is a maximum and a field angle in the Y-axis direction is a minimum (a maximum in a negative direction) is defined as 106, and where neither |DX5A−DX4A| nor |DX5A−DX6A| includes zero.

8. An image display apparatus according to claim 1, 2 or 7, wherein said reflecting surface having a strongest refracting power is formed from a rotationally asymmetric surface having not more than two planes of symmetry, said rotationally asymmetric surface having a configuration which satisfies the following conditions:

$$0.26 < DY6 - DY4 < 0.40 (1/mm) \quad (7\text{-}1)$$

$$0.19 < DY3 - DY1 < 0.38 (1/mm) \quad (8\text{-}1)$$

where DY4, DY6, DY1 and DY3 are tilts in the Y-axis direction at respective positions on said reflecting surface at which principal rays 104, 106, 101 and 103 are reflected by said reflecting surface, said principal rays 104, 106, 101 and 103 being defined such that, with respect to an image display area of said image display device, a principal ray corresponding to an upper-right corner of the image display area where field angles in both the X- and Y-axis directions are maximums is defined as 104, and a principal ray corresponding to a lower-right corner of the image display area where a field angle in the X-axis direction is a maximum and a field angle in the Y-axis direction is a minimum (a maximum in a negative direction) is defined as 106, and further a principal ray corresponding to a center of an upper edge of the image display area where a field angle in the X-axis direction is zero and a field angle in the Y-axis direction is a maximum is defined as 101, and further a principal ray corresponding to a center of a lower edge of the image display area where a field angle in the X-axis direction is zero and a field angle in the Y-axis direction is a minimum is defined as 103.

9. An image display apparatus according to claim 1, 2, 3, 7 or 8, wherein a reflecting surface other than said reflecting surface having a strongest refracting power is formed from a rotationally asymmetric surface having not more than two planes of symmetry, said rotationally asymmetric surface having a configuration which satisfies the following conditions:

$$0.05 < DY6A - DY4A < 0.20 (1/\text{mm}) \quad (9\text{-}1)$$

$$0.05 < DY3A - DY1A < 0.20 (1/\text{mm}) \quad (10\text{-}1)$$

where DY1A, DY3A, DY4A and DY6A are tilts in the Y-axis direction at respective positions of said reflecting surface at which principal rays 101, 103, 104 and 106 are reflected by said reflecting surface, said principal rays 101, 103, 104 and 106 being defined such that, with respect to an image display area of said image display device, a principal ray corresponding to a center of an upper edge of the image display area where a field angle in the X-axis direction is zero and a field angle in the Y-axis direction is a maximum is defined as 101, and a principal ray corresponding to an upper-right corner of the image display area where field angles in both the X- and Y-axis directions are maximums is defined as 104, and further a principal ray corresponding to a lower-right corner of the image display area where a field angle in the X-axis direction is a maximum and a field angle in the Y-axis direction is a minimum (a maximum in a negative direction) is defined as 106, and further a principal ray corresponding to a center of a lower edge of the image display area where a field angle in the X-axis direction is zero and a field angle in the Y-axis direction is a minimum is defined as 103.

10. An image display apparatus according to any one of claims 1 to 4 and 7 to 9, wherein a reflecting surface other than said reflecting surface having a strongest refracting power is formed from a rotationally asymmetric surface having not more than two planes of symmetry, said rotationally asymmetric surface having a configuration which satisfies the following conditions:

$$-0.05 < DY6A - DY2A < 0.05 (1/\text{mm}) \quad (11\text{-}1)$$

$$-0.15 < DY4A - DY2A < -0.05 (1/\text{mm}) \quad (12\text{-}1)$$

where DY2A, DY4A and DY6A are tilts in the Y-axis direction at respective positions of said reflecting surface at which principal rays 102, 104 and 106 are reflected by said reflecting surface, said principal rays 102, 104 and 106 being defined such that, with respect to an image display area of said image display device, an axial principal ray corresponding to a center of the image display area where field angles in both the X- and Y-axis directions are zero is defined as 102, and a principal ray corresponding to an upper-right corner of the image display area where field angles in both the X- and Y-axis directions are maximums is defined as 104, and further a principal ray corresponding to a lower-right corner of the image display area where a field angle in the X-axis direction is a maximum and a field angle in the Y-axis direction is a minimum (a maximum in a negative direction) is defined as 106.

11. An image display apparatus according to any one of claims 1 to 5 and 7 to 10, wherein said ocular optical system has a transmitting surface disposed to face said image display device, said transmitting surface being formed from a rotationally asymmetric surface having not more than two planes of symmetry, said rotationally asymmetric surface having a configuration which satisfies the following condition:

$$1.5 < |CXY| < 100 \quad (13\text{-}1)$$

where CXY is at least one of values of CX3/CX1, CX6/CX4, CY3/CY1 and CY6/CY4, wherein CY1, CY3, CY4 and CY6 are curvatures in the Y-axis direction and CX1, CX3, CX4 and CX6 are curvatures in the X-axis direction at respective positions on said transmitting surface at which principal rays 101, 103, 104 and 106 pass through said transmitting surface, said principal rays 101, 103, 104 and 106 being defined such that, with respect to an image display area of said image display device, a principal ray corresponding to a center of an upper edge of the image display area where a field angle in the X-axis direction is zero and a field angle in the Y-axis direction is a maximum is defined as 101, and a principal ray corresponding to an upper-right corner of the image display area where field angles in both the X- and Y-axis directions are maximums is defined as 104, and further a principal ray corresponding to a lower-right corner of the image display area where a field angle in the X-axis direction is a maximum and a field angle in the Y-axis direction is a minimum (a maximum in a negative direction) is defined as 106, and further a principal ray corresponding to a center of a lower edge of the image display area where a field angle in the X-axis direction is zero and a field angle in the Y-axis direction is a minimum is defined as 103.

12. An image display apparatus according to any one of claims 1 to 11, wherein said ocular optical system has a prism member, said prism member having at least three optical surfaces having optical actions such as a transmitting action and a reflecting action, said at least three optical surfaces being disposed to face each other across a medium, wherein said at least three optical surfaces include a first surface disposed on a side of said prism member closer to the observer's eyeball and having both a reflecting action and a transmitting action, a second surface having a reflecting action and disposed to face said first surface across said medium on a side of said prism member remote from the observer's eyeball, and a third surface having a transmitting action and positioned such that a bundle of light rays from said image display device enters said prism member through said third surface.

13. An image display apparatus according to claim 12, wherein said prism member has three optical surfaces consisting of said first surface, said second surface and said third surface.

14. An image display apparatus according to claim 12 or 13, wherein said prism member is made of a medium having a refractive index larger than 1.3.

15. An image display apparatus according to claim 14, wherein the medium of said prism member is a plastic material.

16. An image display apparatus according to claim 12, wherein all reflecting surfaces among the optical surfaces of said prism member have a rotationally asymmetric surface configuration having not more than two planes of symmetry.

17. An image display apparatus according to claim 12, wherein all the optical surfaces of said prism member have a rotationally asymmetric surface configuration having not more than two planes of symmetry.

18. An image display apparatus according to any one of claims 12 to 17, wherein the second surface of said prism member is said reflecting surface having a strongest refracting power.

19. An image display apparatus according to any one of claims 12 to 18, wherein the reflecting action of the first surface of said prism member is total reflection realized by arranging said first surface such that a bundle of light rays is incident on said first surface at an angle exceeding a critical angle for total reflection.

20. An image display apparatus according to any one of claims 12 to 19, wherein said prism member is arranged to form an optical path such that a bundle of light rays from said image display device enters said prism member through said third surface and is reflected by said first surface, and the reflected light rays are reflected by said second surface and exit from said prism member through said first surface.

21. An image display apparatus according to any one of claims 1 to 20, wherein the rotationally asymmetric surface having not more than two planes of symmetry in said ocular optical system is a plane-symmetry free-form surface having only one plane of symmetry.

22. A head-mounted image display apparatus according to any one of claims 1 to 21, wherein support means is provided to retain the image display apparatus, including said ocular optical system and said image display device, in front of a face of the observer.

23. A head-mounted image display apparatus according to claim 22, wherein said image display device has a right image display device for a right eye and a left image display device for a left eye, and said ocular optical system has a right ocular optical system for a right eye and a left ocular optical system for a left eye, and wherein said support means is arranged to retain simultaneously said right image display device, said left image display device, said right ocular optical system and said left ocular optical system.

24. A head-mounted image display apparatus according to claim 22 or 23, wherein said support means has sound generating means which transmits a sound to an ear of the observer.

\* \* \* \* \*